(12) United States Patent
Yoon et al.

(10) Patent No.: US 10,529,225 B2
(45) Date of Patent: Jan. 7, 2020

(54) ELECTRONIC DEVICE, AUDIO OUTPUT DEVICE, AND OPERATING METHOD OF ELECTRONIC DEVICE

(71) Applicant: SAMSUNG ELECTRONICS CO., LTD., Suwon-si (KR)

(72) Inventors: Suk-un Yoon, Yongin-si (KR); Sang-min Kim, Yongin-si (KR); Woong-no Jung, Suwon-si (KR); Jung-yon Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/103,381

(22) Filed: Aug. 14, 2018

(65) Prior Publication Data
US 2019/0122539 A1    Apr. 25, 2019

(30) Foreign Application Priority Data

Oct. 24, 2017    (KR) .................. 10-2017-0138463

(51) Int. Cl.
*G08C 17/02*    (2006.01)
(52) U.S. Cl.
CPC ......... *G08C 17/02* (2013.01); *G08C 2201/20* (2013.01); *G08C 2201/61* (2013.01)
(58) Field of Classification Search
CPC .............................. H04W 92/02; G08C 17/02
See application file for complete search history.

(56) References Cited

U.S. PATENT DOCUMENTS

| 8,681,278 B2 | 3/2014 | McRae et al. |
| 8,881,208 B2 | 11/2014 | Park et al. |

(Continued)

FOREIGN PATENT DOCUMENTS

| KR | 10-2013-0001751 A | 1/2013 |
| KR | 10-2014-0052690 A | 5/2014 |

OTHER PUBLICATIONS

Search Report dated Nov. 20, 2018, issued by the International Searching Authority in counterpart International Patent Application No. PCT/KR2018/008869 (PCT/ISA/210).

(Continued)

*Primary Examiner* — Tuan H Nguyen
(74) *Attorney, Agent, or Firm* — Sughrue Mion, PLLC

(57) ABSTRACT

An electronic device and operating method thereof are provided. The electronic device includes a communicator; a memory configured to store one or more instructions; and a processor configured to execute the one or more instructions stored in the memory to: control the communicator to transmit, to an audio output device via one-way communication, connection information which is used for connection of two-way communication between the electronic device and the audio output device; control the communicator to receive, from the audio output device via the two-way communication, authentication information which is determined based on the connection information; control the communicator to transmit or receive a control signal to or from the audio output device, via the two-way communication, according to an authentication of the audio output device based on the received authentication information; and control the communicator to transmit an audio signal to the audio output device, via the one-way communication.

18 Claims, 19 Drawing Sheets

(56) References Cited

U.S. PATENT DOCUMENTS

| | | | |
|---|---|---|---|
| 2011/0187929 A1* | 8/2011 | Suzuki | H04N 3/27 |
| | | | 348/554 |
| 2011/0310307 A1* | 12/2011 | Takahashi | H03G 1/02 |
| | | | 348/734 |
| 2012/0079473 A1* | 3/2012 | Watanabe | G06F 8/65 |
| | | | 717/170 |
| 2012/0231740 A1 | 9/2012 | Bradley | |
| 2013/0073980 A1 | 3/2013 | Amendolagine et al. | |
| 2013/0083072 A1 | 4/2013 | Yoshino | |
| 2014/0119234 A1 | 5/2014 | Kwon | |
| 2014/0233755 A1* | 8/2014 | Kim | H04R 3/00 |
| | | | 381/77 |

OTHER PUBLICATIONS

Written Opinion dated Nov. 20, 2018, issued by the International Searching Authority in counterpart International Patent Application No. PCT/KR2018/008869 (PCT/ISA/237).

* cited by examiner

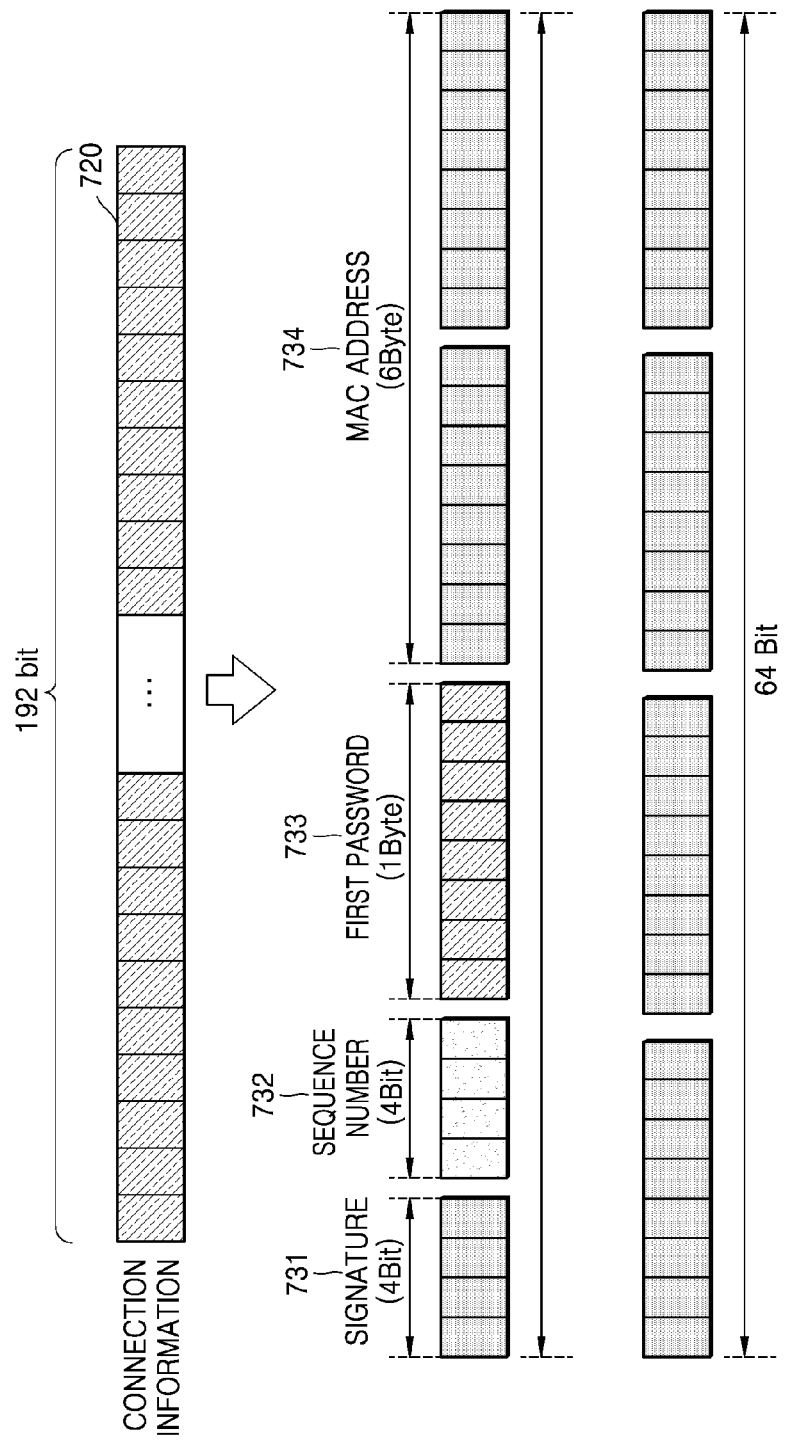

ELECTRONIC DEVICE, AUDIO OUTPUT DEVICE, AND OPERATING METHOD OF ELECTRONIC DEVICE

CROSS-REFERENCE TO RELATED APPLICATION(S)

This application is based on and claims priority under 35 U.S.C. § 119 to Korean Patent Application No. 10-2017-0138463, filed on Oct. 24, 2017, in the Korean Intellectual Property Office, the disclosure of which is incorporated by reference herein in its entirety.

BACKGROUND

1. Field

The disclosure relates to electronic devices, audio output devices, and methods of operating the electronic devices, and more particularly, to electronic devices, audio output devices, and operating methods of the electronic devices, in which an electronic device and an audio output device connected to the electronic device may be controlled more conveniently.

2. Description of Related Art

As the number of users viewing high-definition content via an electronic device increases, not only the image quality but also the audio quality of such content is becoming important. Also, more and more users are viewing content by connecting an audio output device to an electronic device, wherein the audio output device provides high-quality audio and various acoustic effects. Against this backdrop, a method of efficiently controlling an electronic device and an audio output device is needed.

SUMMARY

Provided are electronic devices transmitting or receiving a control signal to or from an audio output device via two-way communication; audio output devices; and methods of operating the electronic devices.

Provided are electronic devices transmitting or receiving a control signal to or from an audio output device via two-way communication, to thereby control the electronic device and an audio output device in conjunction with each other, wherein the two-way communication differs from one-way communication through which an audio signal is transmitted; audio output devices; and methods of operating the electronic devices.

Additional aspects will be set forth in part in the description which follows and, in part, will be apparent from the description, or may be learned by practice of the presented embodiments.

In accordance with an aspect of the disclosure, an electronic device includes: a communicator; a memory configured to store one or more instructions; and a processor configured to execute the one or more instructions stored in the memory to: control the communicator to transmit, to an audio output device via one-way communication, connection information which is used for connection of two-way communication between the electronic device and the audio output device; control the communicator to receive, from the audio output device via the two-way communication, authentication information which is determined based on the connection information; control the communicator to transmit or receive a control signal to or from the audio output device, via the two-way communication, according to an authentication of the audio output device based on the received authentication information; and control the communicator to transmit an audio signal to the audio output device, via the one-way communication.

The control signal may include at least one from among a control signal for controlling the audio output device and a control signal for controlling the electronic device.

The connection information may include a sequence number, a first password, and a Media Access Control (MAC) address of the electronic device, wherein the authentication information includes a second password, the sequence number, and the first password, the second password being generated based on the sequence number, the first password, and the MAC address of the electronic device.

The second password may be acquired by performing a shift operation, by a preset number of bits, on data of two bytes selected based on the sequence number and the first password, from among data of a plurality of bytes of the MAC address of the electronic device.

The control signal may include at least one from among a volume control signal for controlling a volume of the audio signal, a mute control signal for controlling a mute function, and a power control signal for controlling power supply.

The processor may be further configured to execute the one or more instructions to disconnect the two-way communication based on a cable used in the one-way communication being separated from at least one of the electronic device and the audio output device or based on an external input of stopping an audio signal from being output to the audio output device being received.

The processor may be further configured to execute the one or more instructions to: establish connection of the two-way communication between the electronic device and the audio output device in response to a signal for requesting connection of the two-way communication, the signal being received from the audio output device; and maintain connection of the two-way communication according to the authentication of the audio output device based on the received authentication information.

The one-way communication may include communication according to the Sony/Philips Digital Interface (S/PDIF) standard, wherein the two-way communication includes communication using Bluetooth or Wi-Fi.

The processor may be further configured to execute the one or more instructions to synchronize a volume level of the electronic device and a volume level of the audio output device according to the authentication of the audio output device based on the received authentication information.

The processor may be further configured to execute the one or more instructions to control the communicator to divide the connection information into a plurality of frames and transmit the divided connection information to the audio output device, wherein a portion of the connection information is included in a preset area of each of the plurality of frames.

The electronic device may further include a display, wherein the processor is further configured to execute the one or more instructions to control the display to output a notification message corresponding to the control signal.

In accordance with another aspect of the disclosure, an audio output device includes: an amplifier; a communicator; a memory configured to store one or more instructions; and a processor configured to execute the one or more instructions stored in the memory to: control the communicator to receive, from an electronic device via one-way communication, connection information which is used for two-way communication between the audio output device and the electronic device; control the communicator to transmit, to the electronic device via the two-way communication, authentication information which is determined based on the connection information; control the communicator to transmit or receive a control signal to or from the electronic device, via the two-way communication; and control the amplifier to output an audio signal received from the electronic device via the one-way communication.

In accordance with another aspect of the disclosure, an operating method of an electronic device, includes: transmitting, to an audio output device via one-way communication, connection information which is used for connection of two-way communication between the electronic device and the audio output device; receiving, from the audio output device via the two-way communication, authentication information which is determined based on the connection information; transmitting or receiving a control signal to or from the audio output device via the two-way communication, according to an authentication of the audio output device based on the received authentication information; and transmitting an audio signal to the audio output device via the one-way communication.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A and 7B are views for describing connection information transmitted from an electronic device to an audio output device, according to an embodiment;

DETAILED DESCRIPTION

Figure 1:
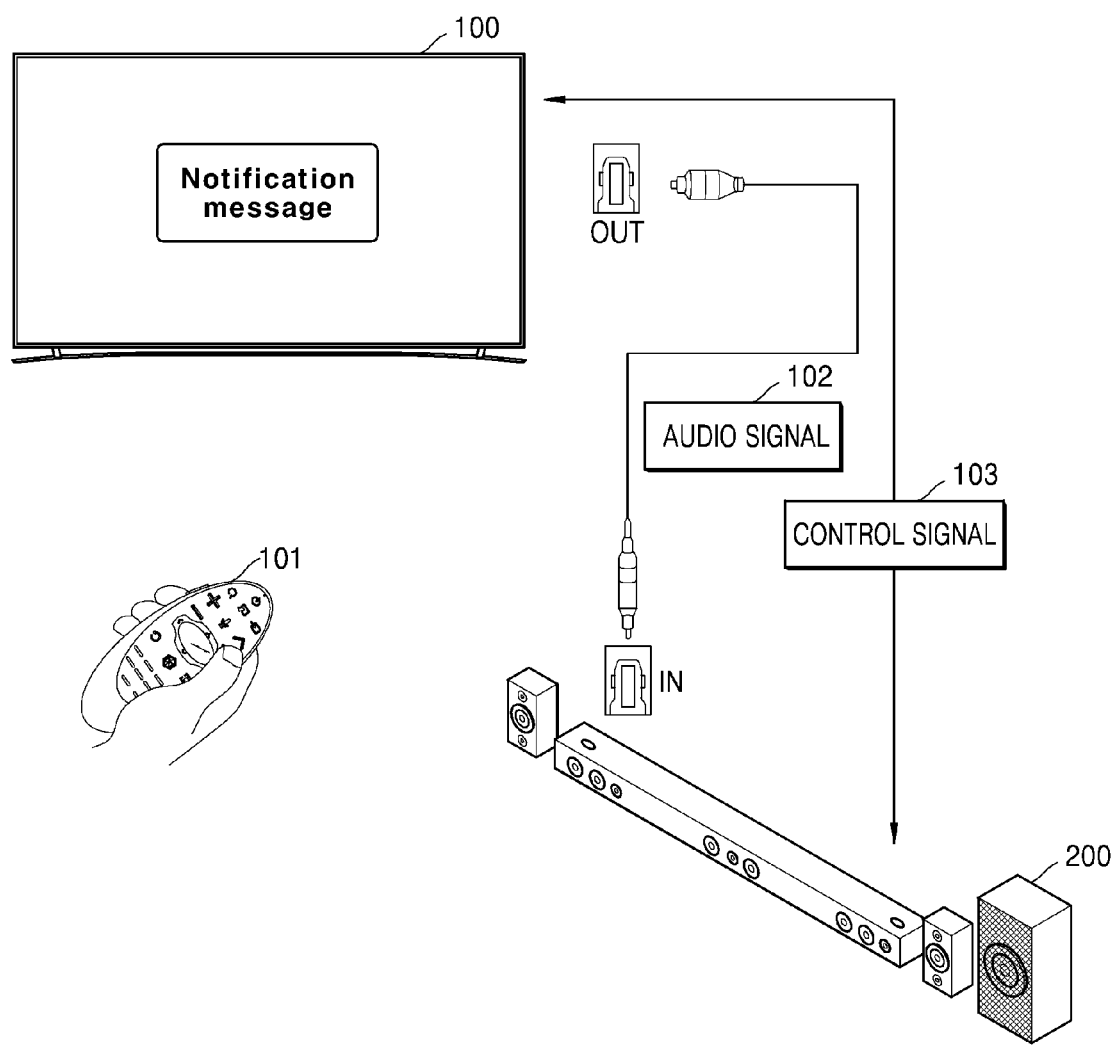
FIG. 1 illustrates an electronic device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 illustrates an electronic device 100 according to an embodiment.

Referring to FIG. 1, the electronic device 100 may be, without limitation, a television (TV), and may be embodied as an apparatus including a memory and a processor. For example, the electronic device 100 may be embodied as one of various electronic devices including a mobile phone, a tablet personal computer (PC), a digital camera, a camcorder, a laptop computer, a PC, a desktop computer, an electronic book (e-book) terminal, a terminal for digital broadcasting, a personal digital assistant (PDA), a portable multimedia player (PMP), navigation, an MP3 player, a wearable device, or the like. The electronic device 100 may be fixed or portable, and may be a digital broadcasting receiver configured to receive digital broadcasting.

The electronic device 100 according to an embodiment may be embodied as a device that further includes a display. The electronic device 100 may be embodied as not only a flat display apparatus but also embodied as a curved display apparatus whose screen is curved with a curvature or a flexible display apparatus whose curvature is adjustable. Output definition of the electronic device 100 may be a high-definition (HD) class, a full HD class, an ultra HD class, or a definition class more clear than the ultra HD class.

The electronic device 100 may be controlled by a control device 101, and the control device 101 may be embodied as one of various devices configured to control the electronic device 100, the various devices including a remote controller, a mobile phone, or the like. Alternatively, in the case that a display of the electronic device 100 is embodied as a touch screen, a finger of a user or an input pen may function as the control device 101.

The control device 101 may control the electronic device 100 by using short-range communication including infrared communication or Bluetooth communication. The control device 101 may control a function of the electronic device 100 by using at least one of a key (including a button), a touchpad, a microphone configured to receive a user's voice, and a sensor configured to recognize a motion of the control device 101.

The control device 101 may include a power on/off button configured to turn on or off power of the electronic device 100. In addition, the control device 101 may perform, on the electronic device 100, switching of channels, adjustment of a volume level, selection from among terrestrial broadcasts, cable broadcasts, and satellite broadcasts, or environment settings. In addition, the control device 101 may be a pointing device. For example, when the control device 101 receives a specific key input, the control device 101 may function as a pointing device.

An audio output device 200 is a device outputting an audio signal 102, and may be connected to the electronic device 100 to output an audio signal 102 of content reproduced by using the electronic device 100 and output an audio file stored in the electronic device 100 (e.g., a music file or a recording). For example, the audio output device 200 may include a speaker, a sound bar or the like, but is not limited thereto.

The electronic device 100 according to an embodiment may transmit an audio signal 102 to the audio output device 200 via one-way communication. For example, the electronic device 100 may transmit an audio signal 102 to the audio output device 200 via communication according to the Sony/Philips digital interface (S/PDIF) standard. The audio output device 200 of the electronic device 100 may be connected to each other via an S/PDIF cable, and the S/PDIF cable may be in the form of a coaxial cable or an optical fiber cable.

However, when the electronic device 100 transmits an audio signal 102 to the audio output device 200 via one-way communication, it is difficult to control the electronic device 100 and the audio output device 200 in conjunction with each other. For example, through one-way communication used in transmission of the audio signal 102, only transmission from the electronic device 100 to the audio output device 200 is possible. Thus, when an input of controlling volume is received from a control device controlling the audio output device 200, the audio output device 200 is unable to transmit a signal to the electronic device 100 to indicate that the volume of the audio output device 200 is being controlled, and the electronic device 100 is unable to output a message indicating that the volume of the audio output device 200 is being controlled. Accordingly, it is difficult to perform, via one-way communication, operations controlling the electronic device 100 and the audio output device 200 in conjunction with each other, such as turning power on and off, volume control, and turning a mute function on and off.

The electronic device 100 according to an embodiment may control the electronic device 100 and the audio output device 200 in conjunction with each other by transmitting or receiving a control signal 103 to or from the audio output device 200 via two-way communication supported by both the electronic device 100 and the audio output device 200. For example, when an external input of changing volume of the audio output device 200 or turning on a mute function of the audio output device 200 is received from a control device controlling the audio output device 200, the audio output device 200 may transmit to the electronic device 100, via two-way communication, a control signal notifying a volume change or a control signal notifying that a mute function is activated. Accordingly, the electronic device 100 may output a message 104 notifying a volume change of the audio output device 200 or that a mute function of the audio output device 200 is activated, to a display. In addition, as another example, when an external input of turning off power is received from the control device 101 controlling the electronic device 100, the electronic device 100 may transmit a control signal for turning off power of the audio output device 200 to the audio output device 200. Accordingly, a user may control turning on and off of power of the electronic device 100 and the audio output device 200 together.

Figure 2:
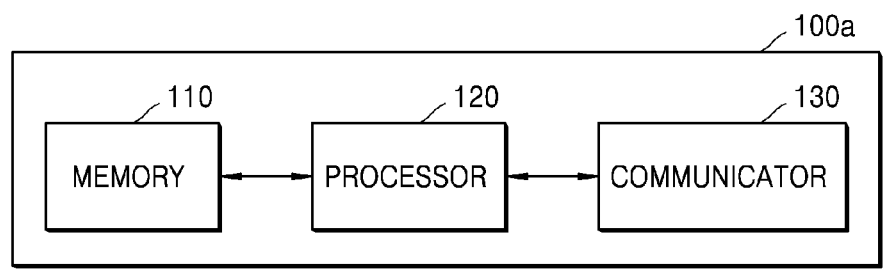
FIG. 2 is a structural block diagram of an electronic device according to an embodiment.

FIG. 2 is a structural block diagram of an electronic device 100a according to an embodiment.

Referring to FIG. 2, the electronic device 100a may include a memory 110, a processor 120, and a communicator 130. However, the electronic device 100a may be embodied with more or fewer elements than the elements shown in FIG. 2 and thus is not limited thereto.

Hereinafter, the elements will now be described below.

The memory 110 according to an embodiment may store programs for processing or controlling the processor 120, and may store data input to or output from the electronic device 100a.

The memory 110 may include at least one of storage media including a flash memory type storage medium, a hard disk type storage medium, a multimedia card micro type storage medium, a card-type memory (e.g., a secure digital (SD) memory, an xD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disc, and an optical disc.

The memory 110 according to an embodiment may include a module including one or more instructions that, when executed, cause the processor 120 to transmit connection information to the audio output device via one-way communication, the connection information being used for connection of two-way communication with an audio output device; receive authentication information determined based on the connection information, from the audio output device, via two-way communication; transmit or receive a control signal to or from the audio output device, via two-way communication, according to an authentication of the audio output device based on the received authentication information; and transmit an audio signal to the audio output device, via one-way communication, such that the audio signal is output through the audio output device.

The processor 120 controls an overall operation of the electronic device 100a. For example, the processor 120 may control a display 150 by executing one or more instructions stored in the memory 110, and may perform functions of the electronic device 100 illustrated in FIGS. 1 through 15.

The processor 120 according to an embodiment may control the communicator 130 such that the communicator 130 transmits connection information used in two-way communication with the audio output device 200 to the audio output device 200 via one-way communication.

For example, the processor 120 may control the communicator 130 such that, in response to physical connection between the electronic device 100 and the audio output device 200 via a cable used in two-way communication or in response to an external input of requesting that an audio signal is output through the audio output device 200, the communicator 130 transmits connection information used for connection of two-way communication with the audio output device 200 to the audio output device 200. Here, connection of two-way communication between the electronic device 100 and the audio output device 200 is not yet established, and thus, the electronic device 100 may control the communicator 130 such that the communicator 130 delivers connection information via one-way communication. One-way communication is used to transmit an audio signal to the audio output device 200, and may include, for example, communication according to the S/PDIF standard, but is not limited thereto.

The processor 120 according to an embodiment may control the communicator 130 such that the communicator 130 transmits connection information by dividing the connection information and incorporating the connection information to a plurality of frames. For example, the processor 120 may include a portion of connection information in a preset area of each of a plurality of frames. A method of transmitting connection information will be described in detail later.

Connection information according to an embodiment may include a sequence number, a first password, and a Media Access Control (MAC) address of the electronic device 100, but is not limited thereto.

When one-way communication used to transmit an audio signal is communication according to the S/PDIF standard, an S/PDIF signal is processed in units of blocks, and each block may include a plurality of frames. A sequence number may refer to a number used to identify a position of a frame in a sequence of a plurality of frames constituting a block.

A first password may refer to, without limitation, a password or a personal identification number (PIN) needed to set up connection of secure two-way communication. According to an embodiment, connection information may further include signature in addition to a sequence number, a first password, and a MAC address. For example, signature may refer to preset data that notifies a start of connection information.

The processor 120 according to an embodiment receives, via two-way communication, authentication information determined based on connection information, from the audio output device 200.

Authentication information may include a sequence number and a first password received from the electronic device 100 and a second password acquired from the sequence number and the first password. In addition, when connection information includes signature, authentication information may further include signature that the audio output device 200 has received from the electronic device 100. The second password is acquired based on the sequence number and the first password, and thus, in order for the audio output device 200 to acquire the second password, it is essential that the audio output device 200 has access to the sequence number and the first password received from the electronic device 100. The audio output device 200 may transmit, as authentication information, not only the sequence number and the first password received from the audio output device 200, but also the second password acquired from the sequence number and the first password. Accordingly, security of two-way communication between the electronic device 100 and the audio output device 200 may be further strengthened.

The processor 120 according to an embodiment controls the communicator 130 to receive authentication information from the audio output device 200 via two-way communication. Two-way communication may include Bluetooth or Wi-Fi communication, but is not limited thereto. In order to receive authentication information via two-way communication, two-way communication between the electronic device 100 and the audio output device 200 has to be established. In response to the connection information being received from the electronic device 100, the audio output device 200 may transmit, to the electronic device 100, a signal for requesting connection of two-way communication, and the processor 120 may establish connection of two-way communication as the signal for requesting connection of two-way communication is received. The two-way communication established here may be an insecure serial port profile (SPP), but is not limited thereto.

The processor 120 may authenticate the audio output device 200 based on the received authentication information, and may determine, based on a result of the authentication, whether to maintain connection of two-way communication with the audio output device 200.

The processor 120 according to an embodiment controls the communicator 130 such that, as the audio output device 200 is authenticated, the communicator 130 transmits or receives a control signal to or from the audio output device 200 via two-way communication. A control signal may include at least one of a control signal for controlling the audio output device 200 and a control signal for controlling the control device 101, and may include at least one of a volume control signal for controlling volume of an audio signal, a mute control signal for controlling a mute function, and a power control signal for controlling power.

In addition, the processor 120 according to an embodiment controls the communicator 130 such that the communicator 130 transmits an audio signal to the audio output device 200, via one-way communication, so that the audio signal is output through the audio output device 200.

The communicator 130 may connect the electronic device 100a with an external device (e.g., the audio output device 200) by the control of the processor 120. The processor 120 may transmit or receive content to or from the connected external device connected via the communicator 130, and may download an application from the external device or conduct web browsing on the external device.

The communicator 130 according to an embodiment may include an S/PDIF module to provide one-way communication between the electronic device 100 and the audio output device 200. In addition, the communicator 130 may include at least one of a Bluetooth module and a Wi-Fi module to provide two-way communication between the electronic device 100 and the audio output device 200.

The communicator 130 according to an embodiment may transmit, by the control of the processor 120 and via one-way communication, connection information used in connection for two-way communication between the electronic device 100 and the audio output device 200, and may receive authentication information from the audio output device 200. In addition, the communicator 130 may transmit or receive, by the control of the processor 120, a control signal to or from the audio output device 200, via two-way communication. In addition, the communicator 130 may transmit an audio signal to the audio output device 200, by the control of the processor 120, via one-way communication.

The electronic device 100 according to various disclosed embodiments may control the electronic device 100 and the audio output device 200 in conjunction with each other by transmitting an audio signal to the audio output device 200 via one-way communication and transmitting or receiving a control signal to or from the audio output device 200 via two-way communication.

Figure 3:
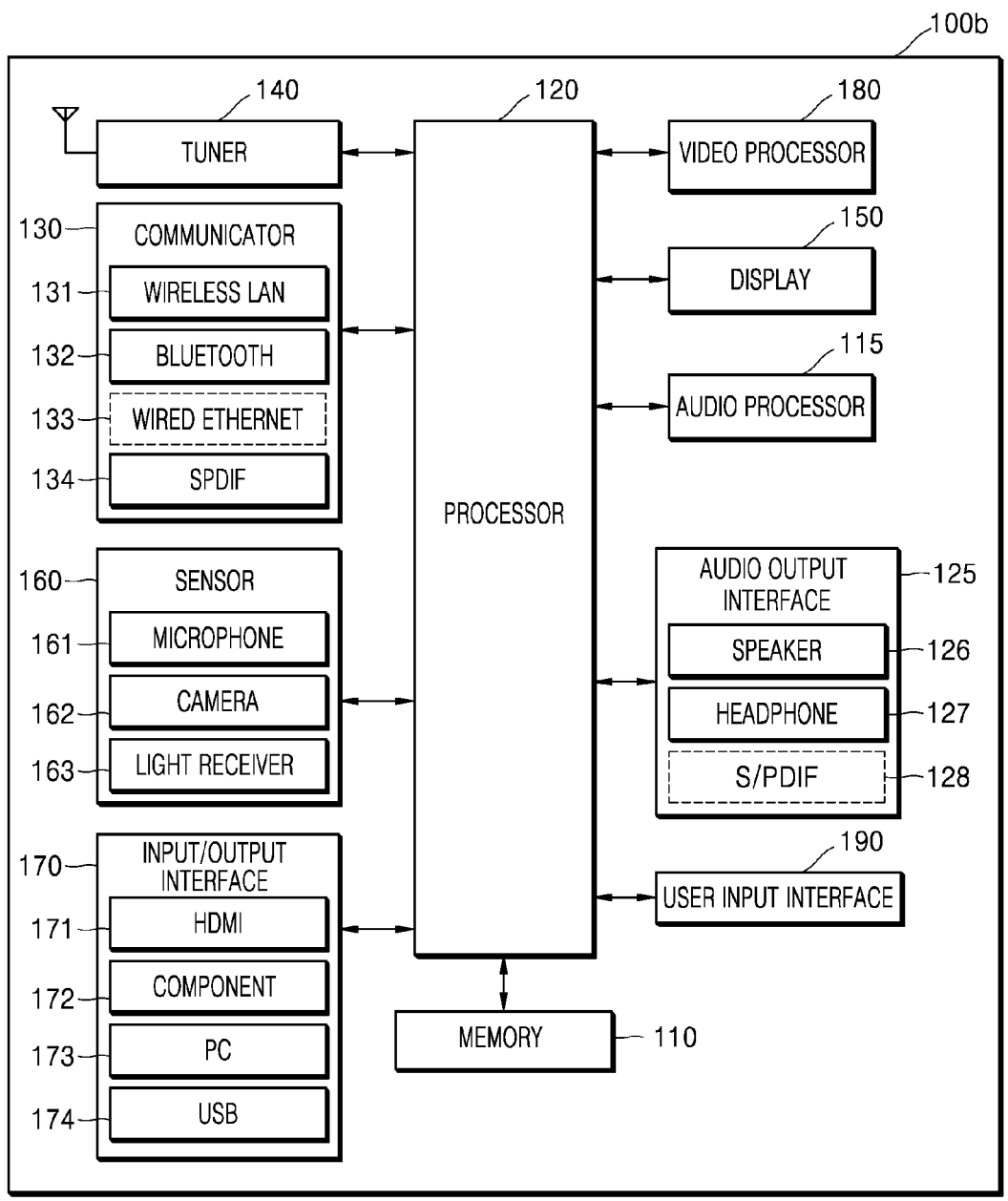
FIG. 3 is a structural block diagram of an electronic device according to another embodiment.

FIG. 3 is a structural block diagram of an electronic device 100b according to another embodiment.

As illustrated in FIG. 3, the electronic device 100b may further include a tuner 140, a display 150, a sensor 160, an input/output interface 170, a video processor 180, an audio processor 115, an audio output interface 125, and a user input interface 190, in addition to the memory 110, the processor 120, and the communicator 130.

Descriptions of the memory 110, the processor 120, and the communicator 130 which are previously provided with reference to FIG. 2 are omitted in FIG. 3.

The tuner 140 may select a frequency of a channel that the electronic device 100b attempts to receive from among many electric wave components by tuning the frequency through amplification, mixing, resonance, or the like with respect to a broadcast signal received in a wired or wireless manner. The broadcast signal may include audio, video, and additional information (for example, an electronic program guide (EPG)).

The broadcast signal received via the tuner 140 is decoded (e.g., audio decoding, video decoding, or additional information decoding) and then is divided into audio, video, and/or additional information. The audio, video, and/or additional information may be stored in the memory 110 by the control of the processor 120.

The electronic device 100b may include one or more tuners 140. The tuner 140 and the electronic device 100b may be embodied as an all-in-one type device; the tuner 140 may be embodied in a separate device (e.g., a set-top box) having a tuner electrically connected to the electronic device 100b; or the tuner 140 may be embodied as a tuner connected to the input/output interface 170.

The communicator 130 may include at least one of a wireless local area network (WLAN) 131, a Bluetooth 132, a wired Ethernet 133, and an S/PDIF 134. In addition, the communicator 130 may include a combination of the WLAN 131, the Bluetooth 132, the wired Ethernet 133, and the S/PDIF 134. The communicator 130 may receive a control signal of the control device 101 by the control of the processor 120. The control signal may be embodied as a Bluetooth type signal, a radio frequency (RF) signal type or a Wi-Fi type signal.

The communicator 130 may further include short-range communication (e.g., near-field communication (NFC), Bluetooth Low Energy (BLE), etc.) in addition to Bluetooth.

The sensor 160 may sense a voice of the user, an image of the user, or an interaction of the user, and may include a microphone 161, a camera 162, and a light receiver 163.

The microphone 161 receives an uttered voice of the user. The microphone 161 may convert the received voice into an electric signal and may output the electric signal to the processor 120.

The camera 162 may receive an image (e.g., sequential frames) corresponding to a motion of the user which includes a gesture within a recognition range of the camera.

The light receiver 163 receives an optical signal (including a control signal) received from the control device 101. The light receiver 163 may receive the optical signal corresponding to a user input (for example, a touch, a press, a touch gesture, a voice, or a motion) from the control device 101. The control signal may be extracted from the received optical signal by the control of the processor 120.

The light receiver 163 according to an embodiment may receive, from the control device 101, at least one of an optical signal for controlling volume of an audio signal output through the electronic device 100b, an optical signal for controlling turning on and off of power of the electronic device 100b, and an optical signal for controlling turning on and off of a mute function.

The input/output interface 170 receives, by the control of the processor 120, a video (e.g., a moving picture, etc.), an audio (e.g., voice, music, etc.), additional information (e.g., an EPG, etc.), or the like from an external source of the electronic device 100b. The input/output interface 170 may include one of a High-Definition Multimedia Interface (HDMI) port 171, a component jack 172, a PC port 173, and a universal serial bus (USB) port 174. The input/output interface 170 may include a combination of the HDMI port 171, the component jack 172, the PC port 173, and the USB port 174.

The memory 110 according to an embodiment may store programs for processing and controlling of the processor 120, and may store data input to the electronic device 100b or data output from the electronic device 100b.

The processor 120 may control overall operations of the electronic device 100b and signal flows between internal elements of the electronic device 100b, and may process data of the electronic device 100b. In the case that a user input is received or a preset and stored condition is satisfied, the processor 120 may execute an operating system (OS) and various applications stored in the memory 110.

By executing one or more instructions stored in the memory 110, the processor 120 according to an embodiment may control a communicator to transmit, via one-way communication, connection information to be used in connection for two-way communication with an audio output device; may control the communicator to receive authentication information determined based on the connection information, from the audio output device, via two-way communication; may control the communicator to transmit or receive a control signal to or from the audio output device, via two-way communication, as the audio output device is authenticated based on the received authentication information; and may transmit an audio signal to the audio output device via one-way communication such that the audio signal is output through the audio output device.

The video processor 180 may process image data to be displayed on the display 150, and may perform various image processing operations including a decoding operation, a rendering operation, a scaling operation, a noise filtering operation, frame rate conversion, resolution conversion, etc., with respect to the image data.

The display 150 according to an embodiment may output a notification message regarding a control signal. For example, when an external input of controlling volume of an audio signal or turning on or off a mute function is received from a control device controlling the audio output device 200 or a control device controlling the electronic device 100, the electronic device 100 may transmit or receive a volume control signal or a mute function control signal to or from the audio output device 200 via two-way communication. In addition, the display 150 may output a notification message about a volume control signal or a mute function control signal by the control of the processor 120.

The display 150 may display a video included in a broadcasting signal received via the tuner 140 by the control of the processor 120, on a screen. In addition, the display 150 may display content input through the communicator 130 or the input/output interface 170 (for example, a moving picture). The display 150 may output an image stored in the memory 110 by the control of the processor 120.

When the display 150 is embodied as a touch screen, the display 150 may be used as both an output device and an input device. The display 150 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. According to a type of the electronic device 100b, the electronic device 100b may include at least two displays 150.

The audio processor 115 performs processing on audio data. The audio processor 115 may perform various processing operations including a decoding operation, an amplification operation, a noise filtering operation, or the like on the audio data.

The audio output interface 125 outputs, by the control of the processor 120, audio included in a broadcast signal that is received by the tuner 140, audio that is input via the communicator 130 or the input/output interface 170, or audio stored in the memory 110. The audio output interface 125 may include at least one of a speaker 126, a headphone output terminal 127, and a S/PDIF output terminal 128.

The user input interface 190 refers to a unit through which the user inputs data to control the electronic device 100b. For example, the user input interface 190 may include, but is not limited to, a key pad, a dome switch, a touch pad, a jog wheel, and a jog switch.

The user input interface 190 may be an element of the control device 101 or an element of the electronic device 100b.

The user input interface 190 according to an embodiment may control volume of an audio signal, turn on or off a mute function or turn on or off power. For example, when a key pad or a dome switch is included as the user input interface 190, examples of an input received by the user input interface 190 may include, without limitation, an input of clicking or pressing a key indicating increase or decrease of volume (up or down), an input of clicking or pressing a key corresponding to a mute function, or an input of clicking or pressing a power key.

The block diagrams of the electronic devices 100a and 100b shown in FIGS. 2 and 3 are block diagrams for an embodiment. Elements of the block diagram may be integrated, added, or omitted based on the specifications of the electronic devices 100a and 100b as actually implemented. For example, when necessary, two or more elements may be integrated into one element or one element may be divided into two or more elements. A function executed in each block is intended to describe embodiments, and a detailed operation or apparatus thereof does not limit the scope of the present disclosure.

Figure 4:
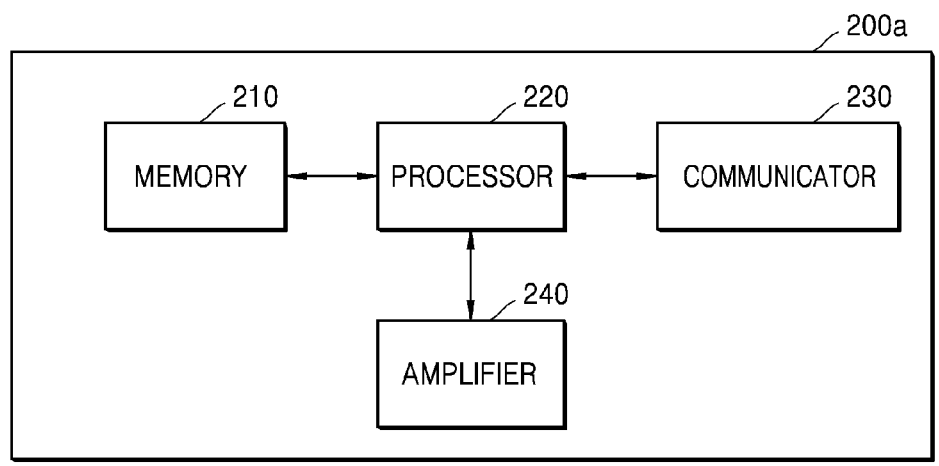
FIG. 4 is a structural block diagram illustrating an audio output device according to an embodiment.

FIG. 4 is a structural block diagram illustrating an audio output device 200a according to an embodiment.

Referring to FIG. 4, the audio output device 200a may include a memory 210, a processor 220, a communicator 230, and an amplifier 240. However, the audio output device 200a may be embodied by more elements than the illustrated elements, and is not limited to the above-described embodiment.

The memory 210 according to an embodiment may store programs for processing and controlling the processor 220 of the audio output device 200a, and may store data input to or output from the audio output device 200a.

The memory 210 may include at least one of storage mediums including a flash memory type storage medium, a hard disk type storage medium, a multimedia card micro type storage medium, a card-type memory (e.g., a secure digital (SD) memory, an xD memory, etc.), a random-access memory (RAM), a static random-access memory (SRAM), a read-only memory (ROM), an electrically erasable programmable read-only memory (EEPROM), a programmable read-only memory (PROM), a magnetic memory, a magnetic disc, and an optical disc.

The memory 210 according to an embodiment may include a module including one or more instructions that, when executed, cause the processor 220 to receive from the electronic device 100, via one-way communication, connection information used for connection of two-way communication with the electronic device 100; transmit to the electronic device 100, via two-way communication, authentication information determined based on the connection information; transmit or receive a control signal to or from the electronic device 100; and output an audio signal received from the electronic device 100 via one-way communication.

The processor 220 controls overall operations of the audio output device 200a. For example, the memory 210 may control the communicator 230 and the amplifier 240 by executing one or more instructions stored in the memory 210, and may perform the functions of the audio output device 200a illustrated in FIGS. 1 through 15.

The processor 220 according to an embodiment may control the communicator 230, by executing one or more instructions, such that the communicator 230 receives connection information used for connection of two-way communication with the electronic device 100, from the electronic device 100, via one-way communication. One-way communication is used to transmit an audio signal from the electronic device 100 to the audio output device 200a, and may include, for example, communication according to the S/PDIF standard, but is not limited thereto. The connection information received from the electronic device 100 may include a sequence number, a first password, and a MAC address of the electronic device 100, but is not limited thereto.

The processor 220 according to an embodiment may control the communicator 230, by executing one or more instructions, such that the communicator 230 transmits authentication information determined based on connection information, to the electronic device 100, via two-way communication. Authentication information is determined based on connection information received from the electronic device 100, and may include a sequence number and a first password included in the connection information and a second password acquired based on the sequence number, the first password, and a MAC address of the electronic device 100. The processor 220 may control the communicator 230 such that the communicator 230 transmits authentication information determined based on the connection information received from the electronic device 100, to the electronic device 100, to thereby prove that the audio output device 200a is connected to the electronic device 100.

The processor 220 according to an embodiment may control the communicator 230 to transmit or receive a control signal to or from the electronic device 100 via two-way communication, as the audio output device 200a is authenticated based on authentication information. For example, when an external input of turning on a mute function is received from a control device controlling the audio output device 200a, the processor 220 may activate a mute function of the audio output device 200a, and may control the communicator 230 to transmit, to the electronic device 100, a control signal notifying that the mute function is activated. Accordingly, the electronic device 100 may output a message notifying that the mute function of the audio output device 200a connected to the electronic device 100 is activated. Alternatively, when an external input of turning off power of the electronic device 100 is received from the control device 101 controlling the electronic device 100, the electronic device 100 may transmit a control signal for turning off power of the audio output device 200a, to the audio output device 200a. Accordingly, the processor 220 may control the communicator 230 such that the communicator 230 receives the control signal for turning off power of the audio output device 200a.

In addition, the processor 220 may execute one or more instructions to control the amplifier 240 such that the amplifier 240 outputs an audio signal received from the electronic device 100 via one-way communication. As an audio signal of content reproduced by using the electronic device 100 is set to be output from the audio output device 200a, the processor 220 may control the communicator 230 such that the communicator 230 receives an audio signal from the audio output device 200a via one-way communication, and may control the amplifier 240 such that the amplifier 240 outputs the received audio signal.

The communicator 230 according to an embodiment may include one or more modules to provide one-way communication and two-way communication with the electronic device 100. For example, when the audio output device 200a receives an audio signal from the electronic device 100 via communication according to the S/PDIF standard, the communicator 230 may include an S/PDIF module. In addition, when the audio output device 200a transmits or receives a control signal to or from the electronic device 100 via Bluetooth or Wi-Fi communication, the communicator 230 may include a Bluetooth module or a Wi-Fi module, but is not limited thereto.

The amplifier 240 according to an embodiment may amplify and output an audio signal by the control of the processor 220.

Figure 5:
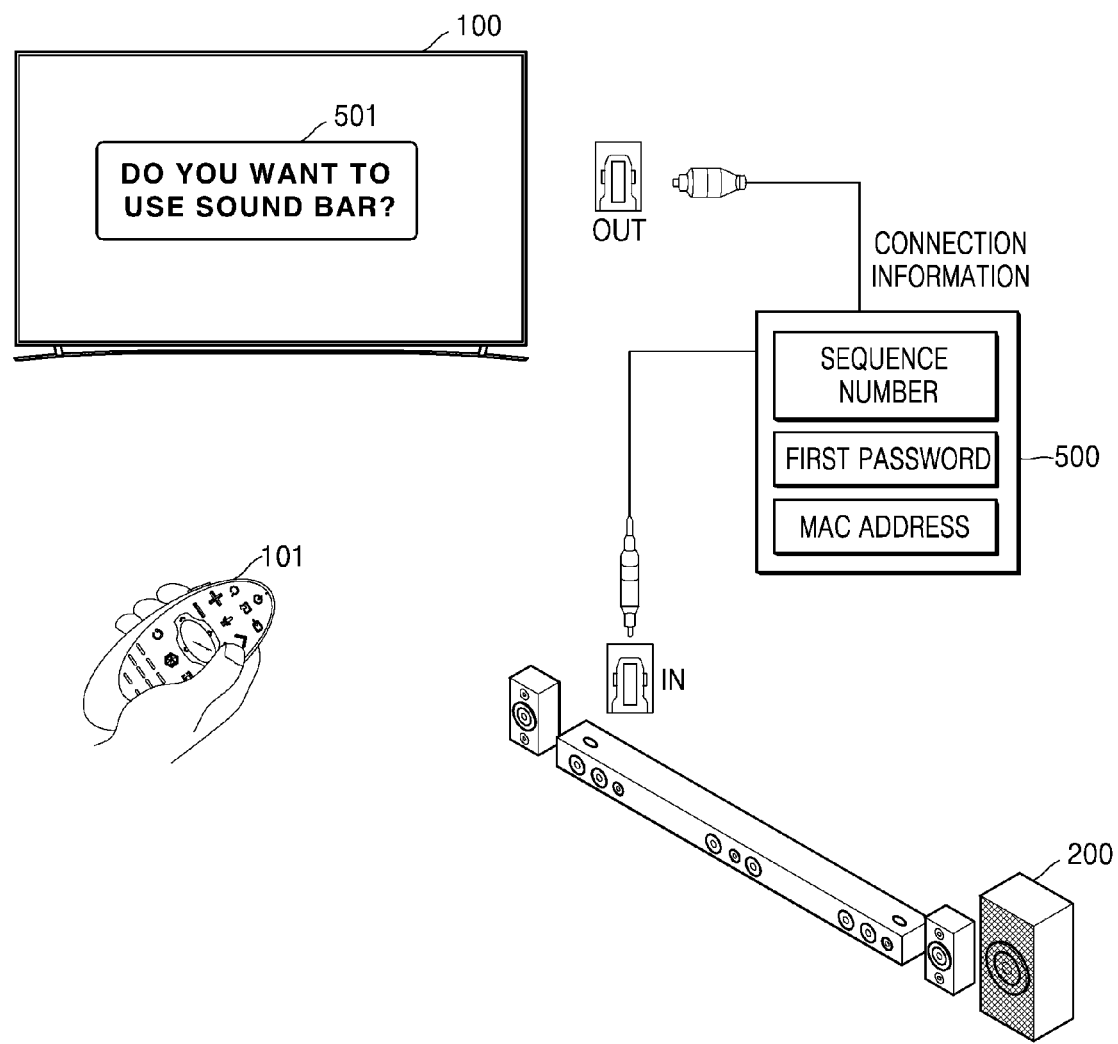
FIG. 5 is a view for describing a method by which an electronic device transmits connection information to an audio output device, according to an embodiment.

FIG. 5 is a view for describing a method of transmitting connection information, performed by an electronic device 100, to an audio output device 200, according to an embodiment.

The electronic device 100 according to an embodiment may transmit connection information to the audio output device 200 via one-way communication, the connection information being used for connection of two-way communication to an audio output device. For example, the electronic device 100 may control the audio output device 200 such that an audio signal of content reproduced by using the electronic device 100 is output through the audio output device 200 according to a previously stored setting in the electronic device 100 or user's selection. For example, the electronic device 100 may receive a user input of selecting to use the audio output device 200 from the control device 101. In response to the received user input, the electronic device 100 may transmit, to the audio output device 200, connection information used for connection of two-way communication with the audio output device 200. For example, as illustrated in FIG. 5, when the electronic device 100 and the audio output device 200 are connected to each other via a cable used for one-way communication, the electronic device 100 may output a message 501 prompting selection of whether to use the audio output device 200 (for example, a sound bar). As a user input of selecting to use the audio output device 200 is received from the control device 101, the electronic device 100 may transmit, to the audio output device 200, connection information 500 used for connection of two-way communication with the audio output device 200.

The connection information 500 used for connection of two-way communication with the audio output device 200 may include a sequence number, a first password, and a MAC address of the electronic device 100, but is not limited thereto.

The sequence number may refer to a number indicating a position of a frame in a sequence of a plurality of frames constituting a block. For example, when one-way communication is communication according to the S/PDIF standard, data in an S/PDIF format may be processed in units of blocks, and each block may include 192 frames. The sequence number may refer to a position of a frame in a sequence of the 192 frames constituting each block. For example, a sequence number may have a value that sequentially increases as a plurality of frames are consecutively transmitted, but is not limited thereto. In addition, when one-way communication is communication according to the S/PDIF standard, the sequence number may be 4 bit-data, but is not limited thereto.

The first password may refer to information used for security of two-way communication between the electronic device 100 and the audio output device 200, and may be generated as a random value by using the electronic device 100. In order to strengthen security of two-way communication between the electronic device 100 and the audio output device 200, the first password may be periodically renewed. According to an embodiment, the first password may be referred to as a personal identification number (PIN), but is not limited thereto. In addition, when one-way communication established between the electronic device 100 and the audio output device 200 is S/PDIF, the first password may be 1 byte-data, but is not limited thereto.

The MAC address may refer to an address value to uniquely identify the electronic device 100 and may be 6 byte-data.

According to an embodiment, the connection information 500 may further include signature indicating a start of connection information, and the signature may include a predefined value (for example, 0000 or 1111), but is not limited thereto.

The electronic device 100 according to an embodiment may transmit connection information in a predefined data format, via one-way communication established with respect to the audio output device 200, and the connection information may be split and incorporated into a plurality of frames to be transmitted. For example, when one-way communication is S/PDIF, the electronic device 100 may transmit connection information in an S/PDIF data format. As described above, according to S/PDIF, data is processed in units of blocks, and each block may include 192 frames. Here, one piece of connection information may include 192 bits, the bits being split such that one bit is in each of the 192 frames. An operation in which connection information is split and incorporated into a plurality of frames to be transmitted will be described in more detail later with reference to FIGS. 6 through 7B.

Figure 6:
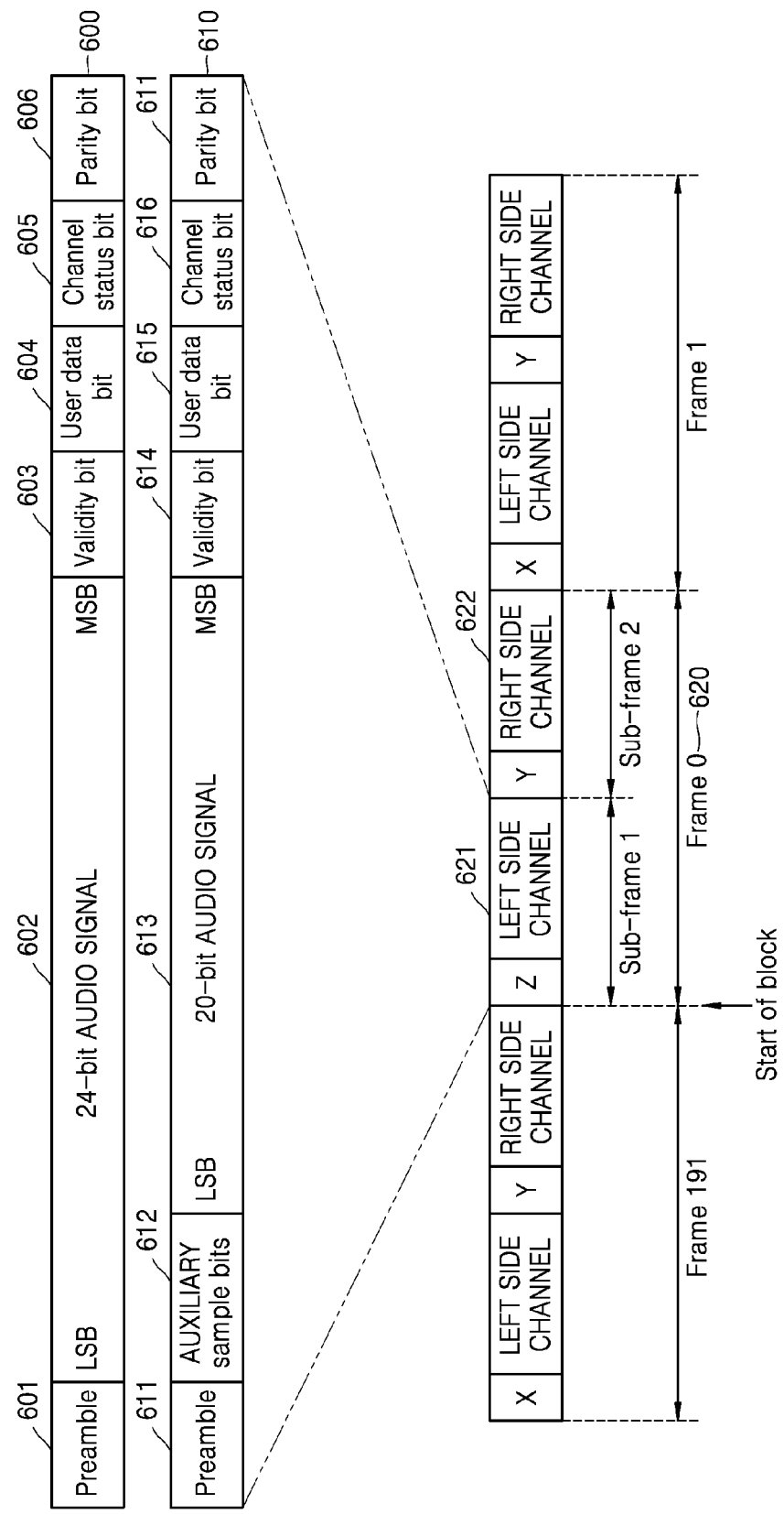
FIG. 6 is a view for describing a data format of one-way communication, when data is transmitted from an electronic device to an audio output device, according to an embodiment.

FIG. 6 is a view for describing a data format of one-way communication transmitting from an electronic device 100 to an audio output device 200, according to an embodiment.

The electronic device 100 according to an embodiment may transmit an audio signal to the audio output device 200 via two-way communication. In addition, the electronic device 100 may transmit connection information to the audio output device 200 via one-way communication, the connection information being used for connection of two-way communication with the audio output device 200. As described above, one-way communication may refer to communication according to the S/PDIF standard, but is not limited thereto.

The electronic device 100 according to an embodiment may transmit an audio signal and connection information used for connection of two-way communication, in an S/PDIF data format, to the audio output device 200, via communication according to the S/PDIF standard.

S/PDIF data is transmitted in units of frames, and each frame may include a subframe corresponding to a left audio channel and a subframe corresponding to a right audio channel. Referring to FIG. 6, each of subframes 600 and 610 may be 32 bit-data. According to an embodiment, 24 bits (602) or 20 bits (613) from among 32 bits of the subframes may be assigned to an audio signal. Each of the subframes 600 and 610 may include, in addition to the audio signals 602 and 613, preambles 601 and 611 indicating starts of the subframes 600 and 610, validity bits 603 and 614 for determining validity of the audio signals 602 and 613, user data bits 604 and 615, channel status bits 605 and 616, and parity bits 606 and 617. In addition, when 20 bits are assigned to an audio signal, the subframe 610 may further include auxiliary sample bits 612. The validity bits 603 and 614 corresponding to a $28^{th}$ bit from among the 32 bits of one subframe, the subframe 600 or 610, or the parity bits 606 and 617 corresponding to a $31^{st}$ bit from among the 32 bits, may refer to regions that may be used for different purposes according to setting, or they may not be used according to embodiments.

The subframes 600 and 610 according to an embodiment may correspond to one of a left audio channel and a right audio channel of an audio signal, and a frame 620 may both include a subframe 621 corresponding to the left audio channel and a subframe 622 corresponding to the right audio channel.

According to an embodiment, connection information used for connection of two-way communication between the electronic device 100 and the audio output device 200 may be included in the channel status bits 605 and 616 of the subframes 600 and 610 to be transmitted. One bit from among the 32 bits of each of the subframes 600 and 610 may be assigned to the channel status bits 605 and 616, and one piece of connection information may be split and incorporated into channel status bits to be transmitted, wherein the channel status bits are each assigned to one of 192 subframes. The audio output device 200 may extract channel status bits from the 192 subframes to obtain one piece of connection information by combining the channel status bits extracted from the 192 subframes.

Figure 7A:
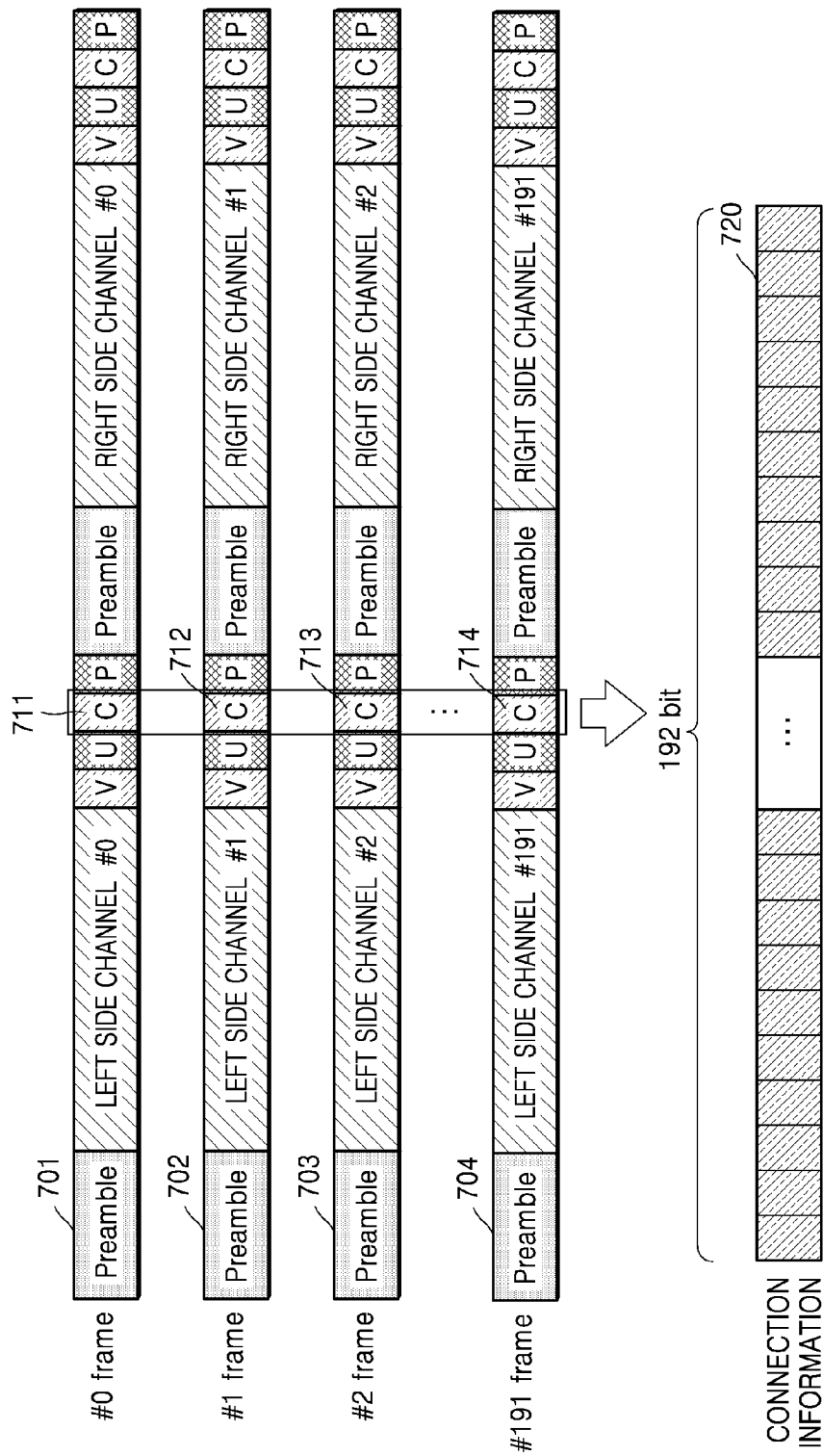

FIGS. 7A and 7B are views for describing connection information transmitted from an electronic device 100 to an audio output device 200, according to an embodiment.

Referring to FIG. 7A, the electronic device 100 may split and incorporate one piece of connection information 720 to 192 frames 701 through 704 to transmit the connection information 720. For example, each of channel status bits 711 through 714 of the 192 frames 701 and 704 transmitted from the electronic device 100 to the audio output device 200 may include information of one bit from among the connection information 720 of 192 bits.

Referring to FIG. 7A, one frame may include a subframe corresponding to a left audio channel and two subframes corresponding to a right audio channel. The subframe corresponding to the left audio channel and the subframes corresponding to the right audio channel may be distinguished from each other by an audio signal included in preambles and the respective subframes, and 28 to 31 bits (for example, validity bits or parity bits) may include different data from one another.

When one-way communication according to the S/PDIF standard is used to transmit an audio signal, S/PDIF data may be processed in units of blocks, and one block may include 192 frames. Upon receiving 192 frames from the electronic device 100, the audio output device 200 may extract the channel status bits 711 through 714 from the 192 frames 701 through 704, and may combine the 192 channel status bits 711 through 714 to acquire one piece of connection information 720.

In addition, as described above, 28 to 31 bits of the subframe corresponding to the left audio channel and the subframes corresponding to the right audio channel (for example, validity bits or parity bits) may include different data from each other. The audio output device 200 may extract channel status bits from one of the two subframes of each frame (the subframe corresponding to the left audio channel or the subframes corresponding to the right audio channel), but is not limited thereto.

Referring to FIG. 7B, the one piece of connection information 720 may include a sequence number 732, a first password 733, and an MAC address 734 of the electronic device 100, and may further include signature 731 according to embodiments. For example, the connection information 720 which includes 192 bits may include signature 731 of 4 bits, the sequence number 732 of 4 bits, the first password 733 of 1 byte, and the MAC address 734 of 6 bytes. Accordingly, from among the 192 bits, 64 bits (8 bytes) include meaningful data, and the rest, 128 bits, may be transmitted as an empty state, but are not limited thereto.

The audio output device 200 according to an embodiment may obtain one piece of connection information from the 192 frames received from the electronic device 100, and may distinguish signature, a sequence number, a first password, and a MAC address included in the connection information.

Figure 8:
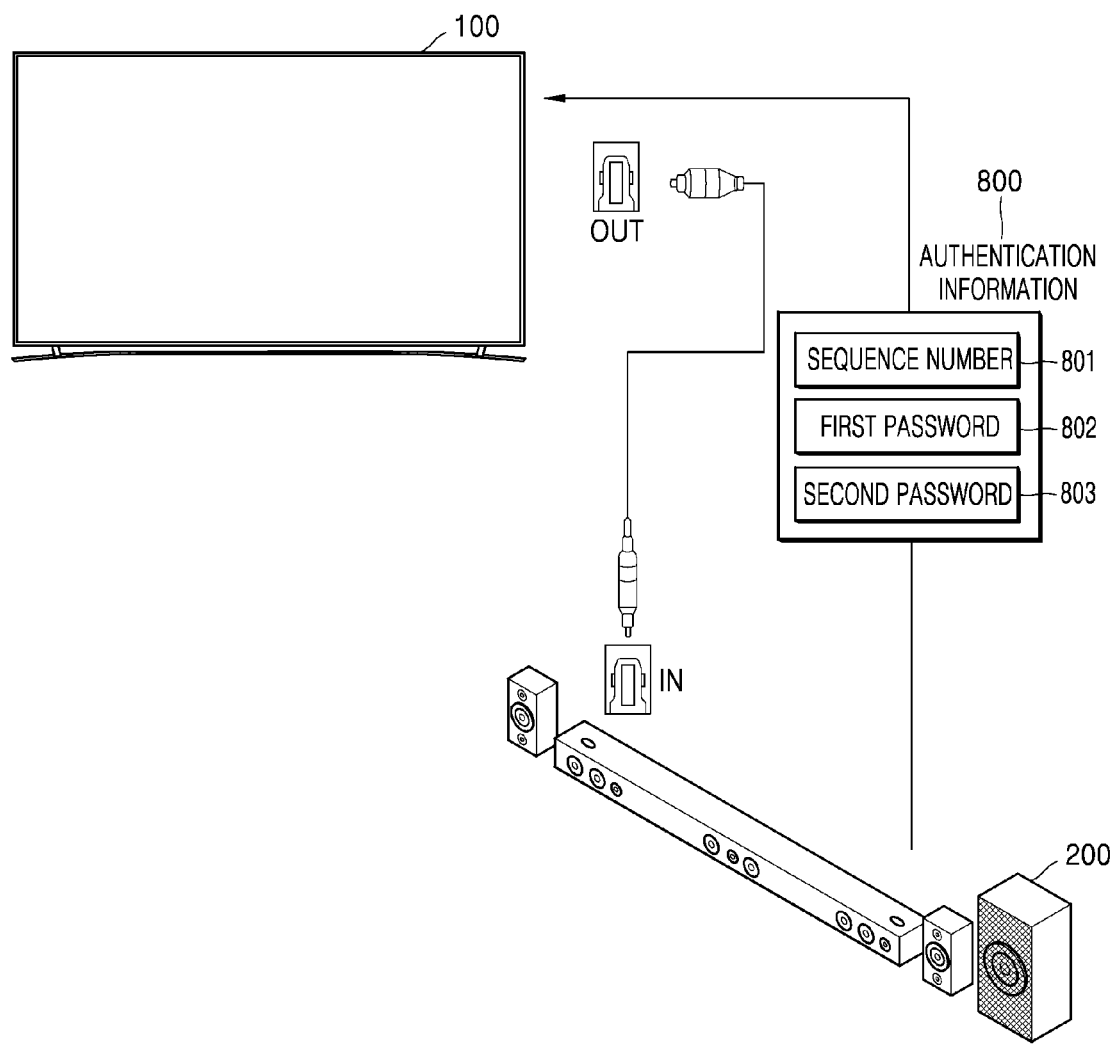
FIG. 8 is a view for describing a method of transmitting authentication information from an audio output device to an electronic device, according to an embodiment.

FIG. 8 is a view for describing a method of receiving authentication information, performed by an electronic device 100, from an audio output device 200, according to an embodiment.

The electronic device 100 according to an embodiment may receive, via two-way communication, authentication information 800 determined based on connection information, from the audio output device 200. The electronic device 100 transmits connection information via one-way communication, but may receive authentication information via two-way communication. The two-way communication used to receive authentication information may include Bluetooth or Wi-Fi communication, but is not limited thereto.

The authentication information 800 may include a sequence number 801, a first password 802, and a second password 803, but is not limited thereto. The sequence number 801 and the first password 802 may be respectively identical to a sequence number and a first password that the audio output device 200 has received from the electronic device 100. The second password 803 may refer to a value obtained based on the sequence number 801, the first password 802, and a MAC address of the electronic device 100. For example, the second password 803 may be a value acquired by performing a shift operation, by a preset number of bits, on data of two bytes selected based on the sequence number 801 and the first password 802 from among data of a plurality of bytes of the MAC address of the electronic device 100, but is not limited thereto. A method of acquiring authentication information will be described in more detail later with reference to FIGS. 9A and 9B.

When the electronic device 100 according to an embodiment transmits connection information used for connection of two-way communication with the audio output device 200, via one-way communication, the audio output device 200 may transmit a signal for requesting connection of two-way communication, to the electronic device 100. In response to the signal for requesting connection of two-way communication, received from the audio output device 200, the electronic device 100 may establish connection of two-way communication between the electronic device 100 and the audio output device 200. The two-way communication established here is established without an authentication process for the electronic device 100 and the audio output device 200, and may include an insecure serial port profile (SPP), but is not limited thereto.

The electronic device 100 according to an embodiment may receive authentication information from the audio output device 200 via insecure two-way communication, and as the audio output device 200 is authenticated based on the received authentication information, the electronic device 100 may maintain connection of two-way communication with the audio output device 200.

Figure 9A:
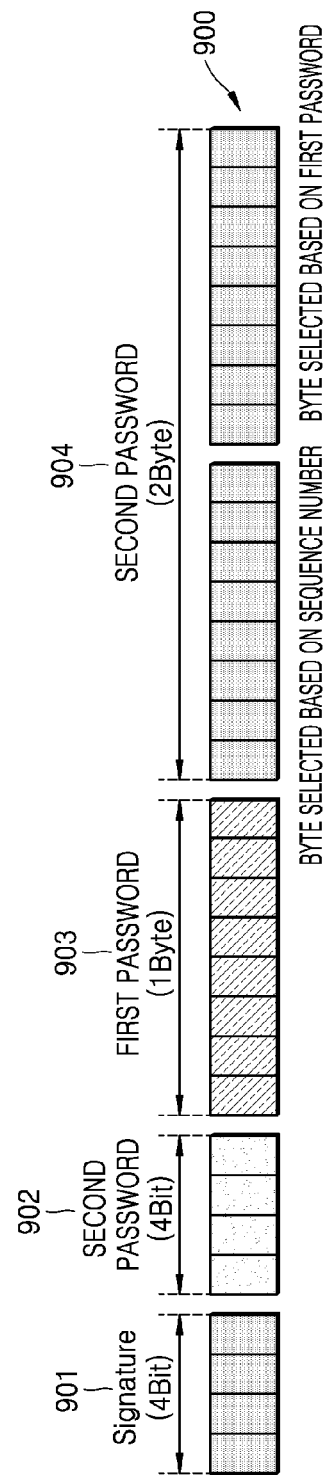
FIGS. 9A and 9B are views for describing authentication information generated in an audio output device, according to an embodiment.
Figure 9B:
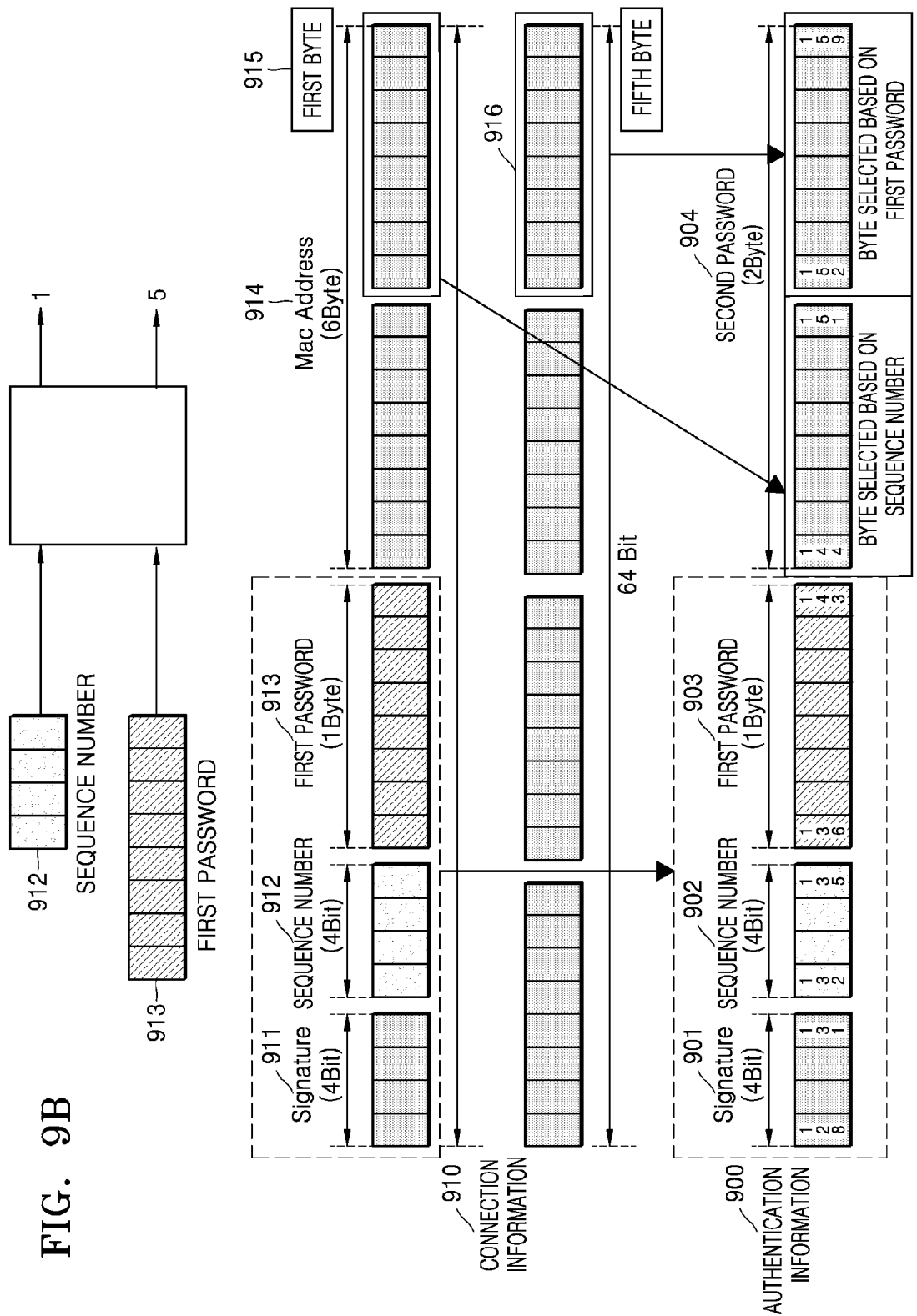

FIGS. 9A and 9B are views for describing authentication information generated in an audio output device 200, according to an embodiment.

An electronic device 100 according to an embodiment may receive authentication information from the audio output device 200 via two-way communication.

Referring to FIG. 9A, authentication information 900 may include a sequence number 902, a first password 903, and a second password 904, and may further include signature 901 according to embodiments. When one-way communication used by the electronic device 100 to transmit an audio signal to the audio output device 200 is S/PDIF, the signature 901 may be 4 bits, the sequence number 902 may be 4 bits, the first password 903 may be 1 byte, and the second password 904 may be 2 bytes.

As described above, the signature 901, the sequence number 902, and the first password 903 included in the authentication information 900 may be respectively identical to signature, a sequence number, and a first password included in connection information that the audio output device 200 has received from the electronic device 100. The second password 904 may refer to a value obtained based on the sequence number 902, the first password 903, and an MAC address received from the electronic device 100. For example, the second password 904 may be a value acquired by performing shift operation on data of two bytes selected based on the sequence number 902 and the first password 903 from among data of a plurality of bytes of the MAC address, by a preset number of bits, but is not limited thereto.

For example, referring to FIG. 9B, when a MAC address 914 included in the connection information 910 is 6-byte data, in order to select two out of the six bytes, a sequence number 912 and a first password 913 may be used. For example, two numbers out of 0 to 5 may be selected based on the sequence number 912 and the first password 913. The method of selecting two numbers out of 0 to 5 based on the sequence number 912 and the first password 913 may be varied according to embodiments. For example, a modular arithmetic operation may be performed on each of the sequence number 912 and the first password 913 to select two from 0 to 5, but the method is not limited thereto.

As two values are selected based on the sequence number 912 and the first password 913, two bytes 915 and 916 corresponding to the selected numbers number from among the MAC address 914 including 6 bytes ($0^{th}$ byte to fifth byte) may be selected. The selected two numbers may be identical according to embodiments, and the selected two bytes may be identical data.

As illustrated in FIG. 9B, when 1 and 5 are selected based on the sequence number 912 and the first password 913, a first byte 915 and a fifth byte 916 may be selected from among 6 bytes of the MAC address 914.

The second password 904 may be obtained by combining values of the first byte 915 and the fifth byte 916 from the MAC address 914 including 6 bytes and performing shift operation on 2 byte-data formed by combination of the first byte 915 and the fifth byte 916, by a preset number of bits. The preset bits may be 1 bit or 2 bits, but are not limited thereto, and the shift operation may be a left shift operation or a right shift operation, but is not limited thereto.

The electronic device 100 according to an embodiment may receive authentication information 900 from the audio output device 200. As the audio output device 200 is authenticated based on the received authentication information 900, the electronic device 100 may transmit or receive a control signal to or from the audio output device 200 via two-way communication.

The electronic device 100 may determine whether signature 911, the sequence number 912, and the first password 913 included in the connection information 910 and the signature 901, the sequence number 902, and the first password 903 included in the authentication information 900 are identical.

The electronic device 100 may also acquire a second password based on the sequence number 902, the first password 903, and the MAC address of the electronic device 100 in a same manner as the audio output device 200 acquires a second password. In addition, the electronic device 100 may determine whether the acquired second password is identical to the second password 904 included in the authentication information 900 to authenticate the audio output device 200.

Figure 10A:
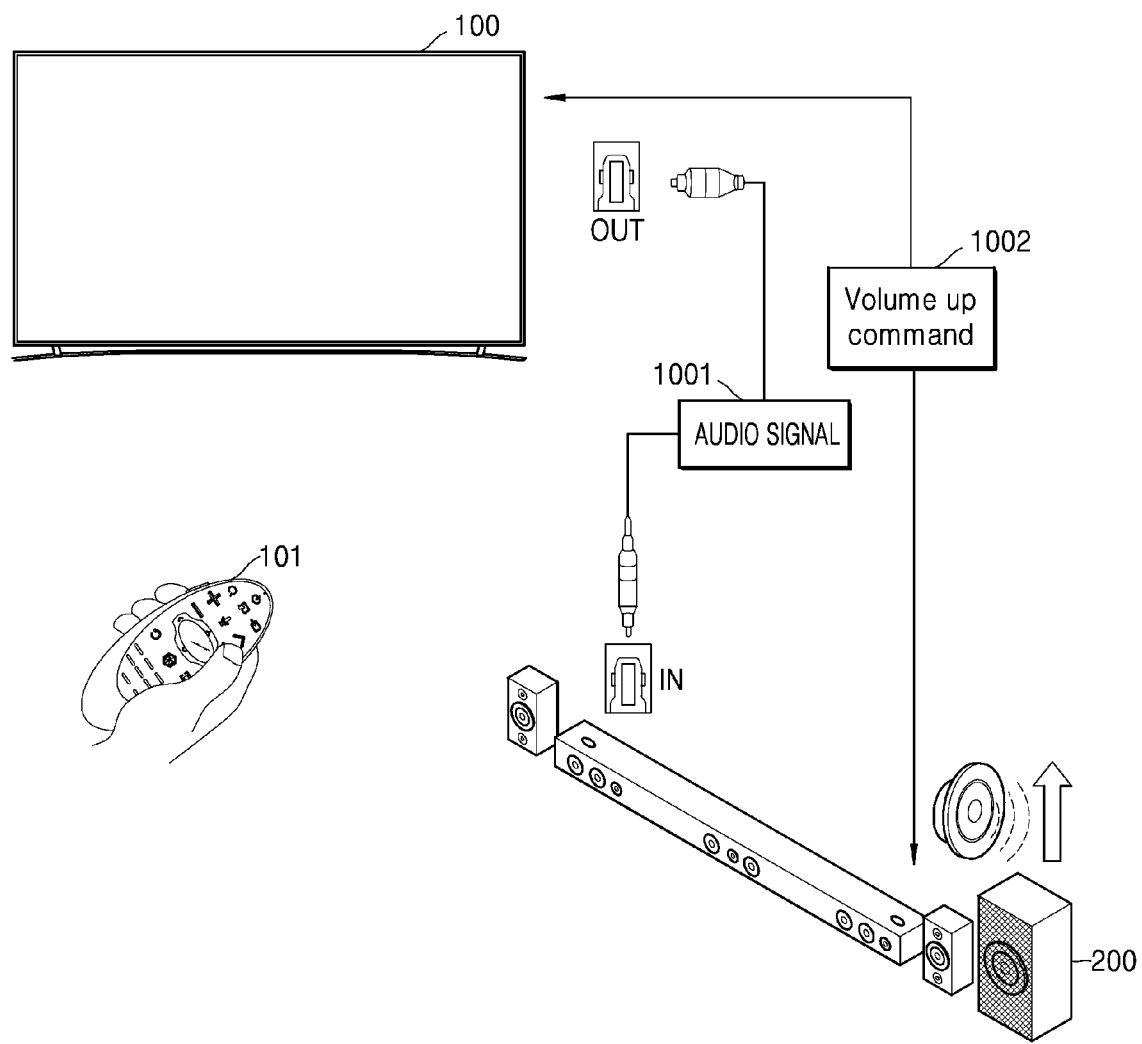
FIGS. 10A and 10B illustrate examples of controlling volume of an audio output device, according to an embodiment.
Figure 10B:
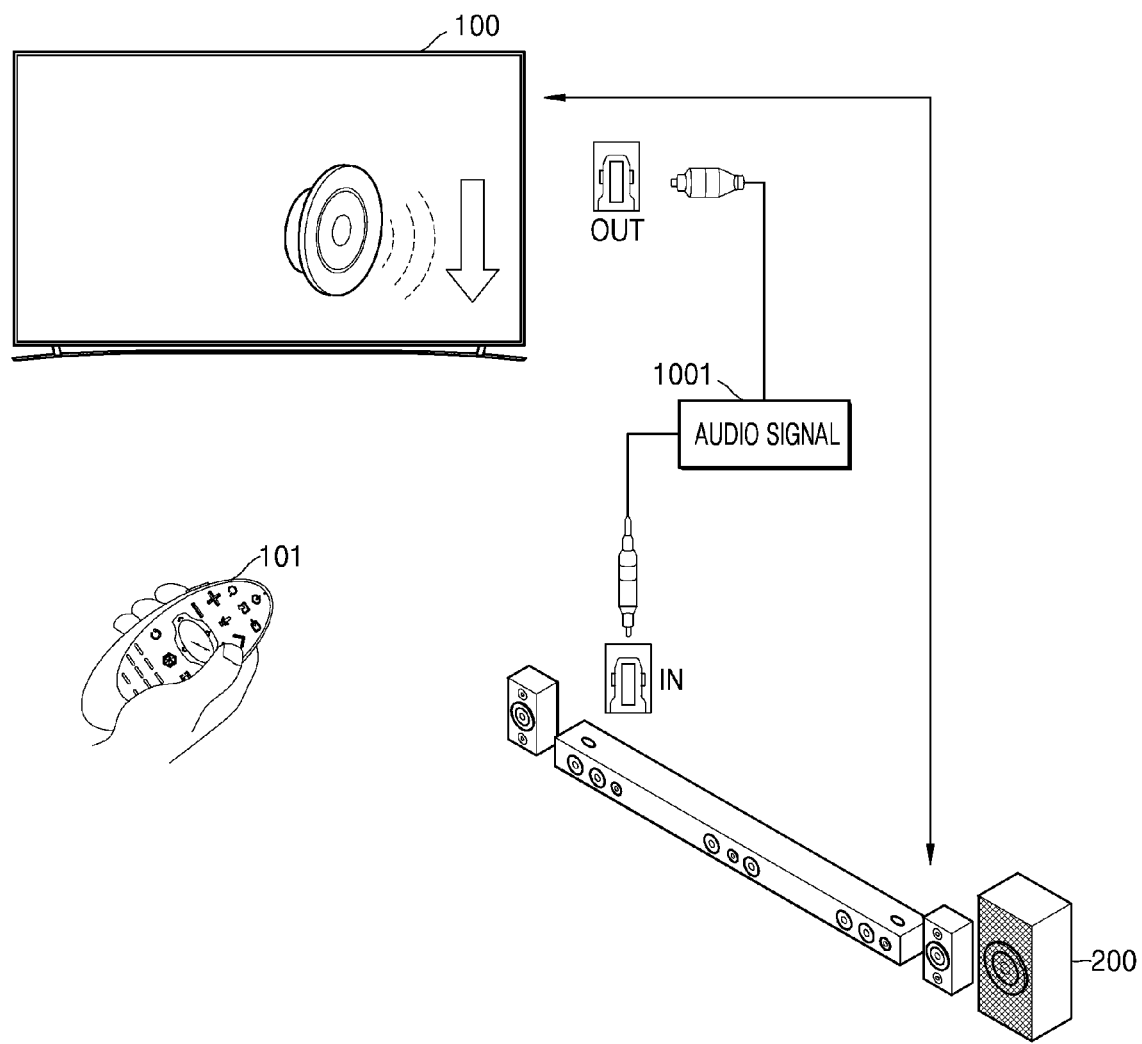

FIGS. 10A and 10B illustrate examples of controlling volume of an audio output device 200, according to an embodiment.

According to an embodiment, the electronic device 100 may transmit or receive a control signal to or from the audio output device 200 via two-way communication, as the audio output device 200 is authenticated based on authentication information.

The electronic device 100 may perform an operation of synchronizing a volume level of the electronic device 100 with a level of the audio output device 200 as the audio output device 200 is authenticated. For example, when a volume level of the electronic device 100 that is currently set may be 15, and that of the audio output device 200 that is currently set may be 10, the electronic device 100 may transmit a control signal for changing the volume level of the electronic device 100 to 15, to the audio output device 200 via two-way communication. Accordingly, the electronic device 100 may allow a user to easily control a volume of an audio signal output from the audio output device 200, by using the control device 101.

When the operation of synchronizing volume levels of the electronic device 100 and the audio output device 200 is completed, as illustrated in FIG. 10A, the electronic device 100 may transmit an audio signal 1001 to the audio output device 200 via one-way communication such that the audio signal 1001 is output from the audio output device 200. For example, the electronic device 100 may transmit the audio signal 1001 to the audio output device 200 via communication according to the S/PDIF standard.

In addition, the electronic device 100 may control volume of the audio signal 1001 output from the audio output device 200 by using the control device 101 controlling the electronic device 100. The electronic device 100 may transmit a volume control signal for controlling volume to the audio output device 200 via two-way communication which differs from one-way communication used in transmitting the audio signal 1001. For example, the electronic device 100 may transmit a volume control signal to the audio output device 200 via Bluetooth or Wi-Fi communication, but is not limited thereto.

Referring to FIG. 10A, the electronic device 100 may receive an external input of raising the volume, from the control device 101, and may, in response to the received external input, transmit a command 1002 for raising the volume to the audio output device 200 via two-way communication. In addition, as the command 1002 for raising the volume is transmitted to the audio output device 200, the electronic device 100 may output a message notifying that a volume of an audio signal is changed.

In addition, according to an embodiment, the electronic device 100 may control volume of the electronic device 100 in response to the external input of controlling volume, received from the control device 101. Referring to FIG. 10B, the electronic device 100 may receive an external input of lowering volume from the control device 101, and may lower volume of the electronic device 100 in response to the received external input. The electronic device 100 may selectively control volume of the electronic device 100 or volume of the audio output device 200 according to internal setting of the electronic device 100 or user setting. For example, when volume of the audio output device 200 is set to be controlled, and an external input of controlling volume is received from the control device 101, the electronic device 100 may transmit, to the audio output device 200, a command for controlling volume of the audio output device 200, via two-way communication. Here, volume of an audio signal output from the electronic device 100 to the audio output device 200 may not be controlled but may be output with a maximum volume.

On the other hand, when volume of the electronic device 100 is set to be controlled, and an external input of controlling volume is received from the control device 101, the electronic device 100 may control volume of the electronic device 100.

In addition, as volume of the electronic device 100 or volume of the audio output device 200 is controlled, the electronic device 100 according to an embodiment may output a notification message about a volume control signal. Accordingly, even when the electronic device 100 transmits an audio signal to the audio output device 200 via one-way communication, the electronic device 100 may transmit or receive a control signal to or from the audio output device 200 via another communication, that is, two-way communication. In addition, as the electronic device 100 outputs a notification message about a control signal, a user may easily determine a control condition of the audio output device 200.

Figure 11:
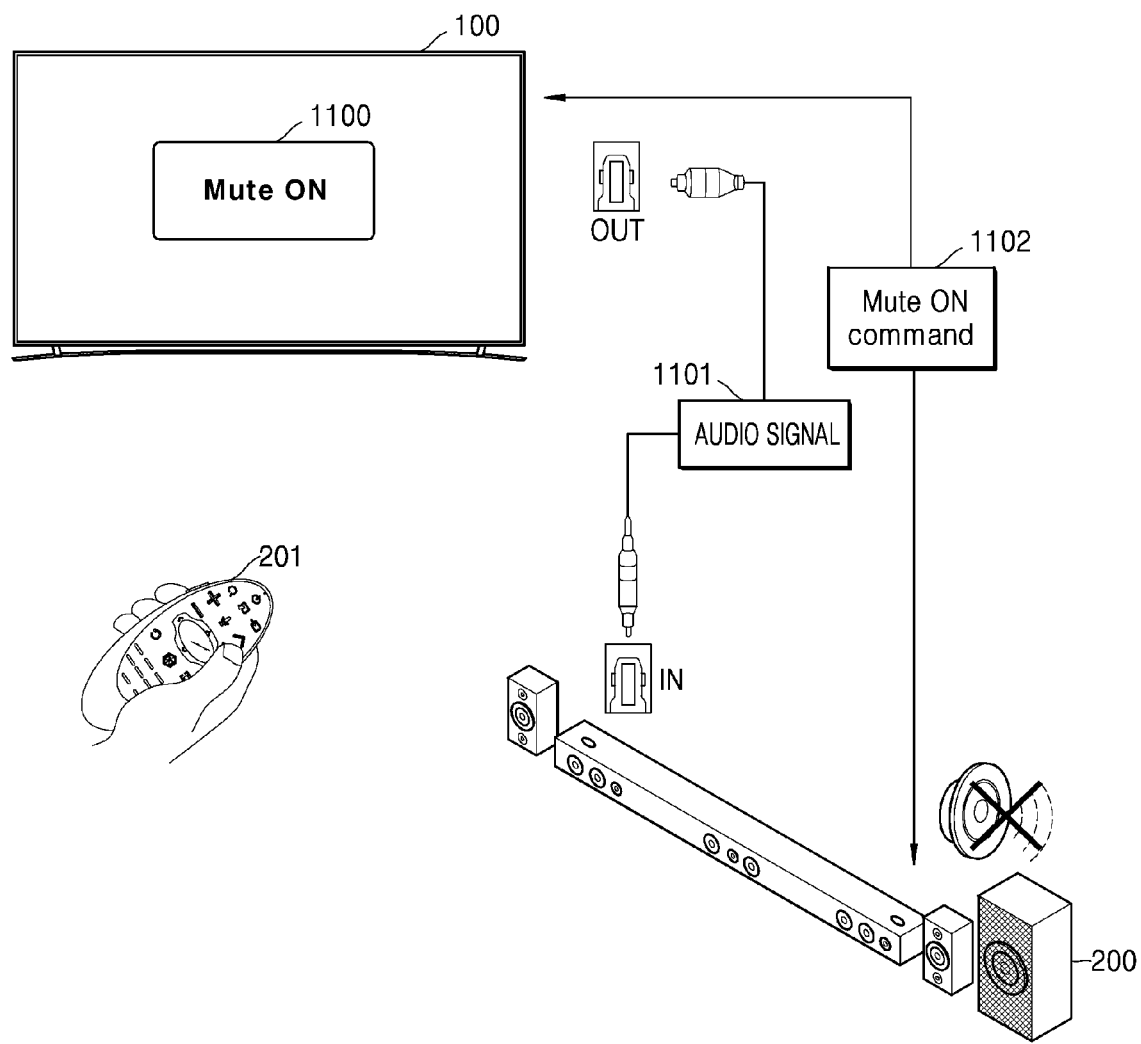
FIG. 11 is a view for describing control of a mute function of an audio output device, according to an embodiment.

FIG. 11 is a view for describing controlling of a mute function of an audio output device 200, according to an embodiment.

According to an embodiment, a user may prevent temporary output of an audio signal 1101 through the audio output device 200 by activating a mute function of the audio output device 200.

Referring to FIG. 11, the electronic device 100 may receive an external input of turning on a mute function from a control device 201 controlling the audio output device 200. In response to the received external input, the audio output device 200 may transmit a mute control signal 1102 for turning on the mute function via two-way communication, to the electronic device 100. In response to the mute control signal received from the audio output device 200, the electronic device 100 may output a message 1100 indicating that the mute function is activated. Accordingly, even when an external input of controlling the audio output device 200 is received from the control device 201, the electronic device 100 may output a message notifying a controlling condition of the audio output device 200 and allow a user to easily determine a controlling condition of the audio output device 200.

Figure 12A:
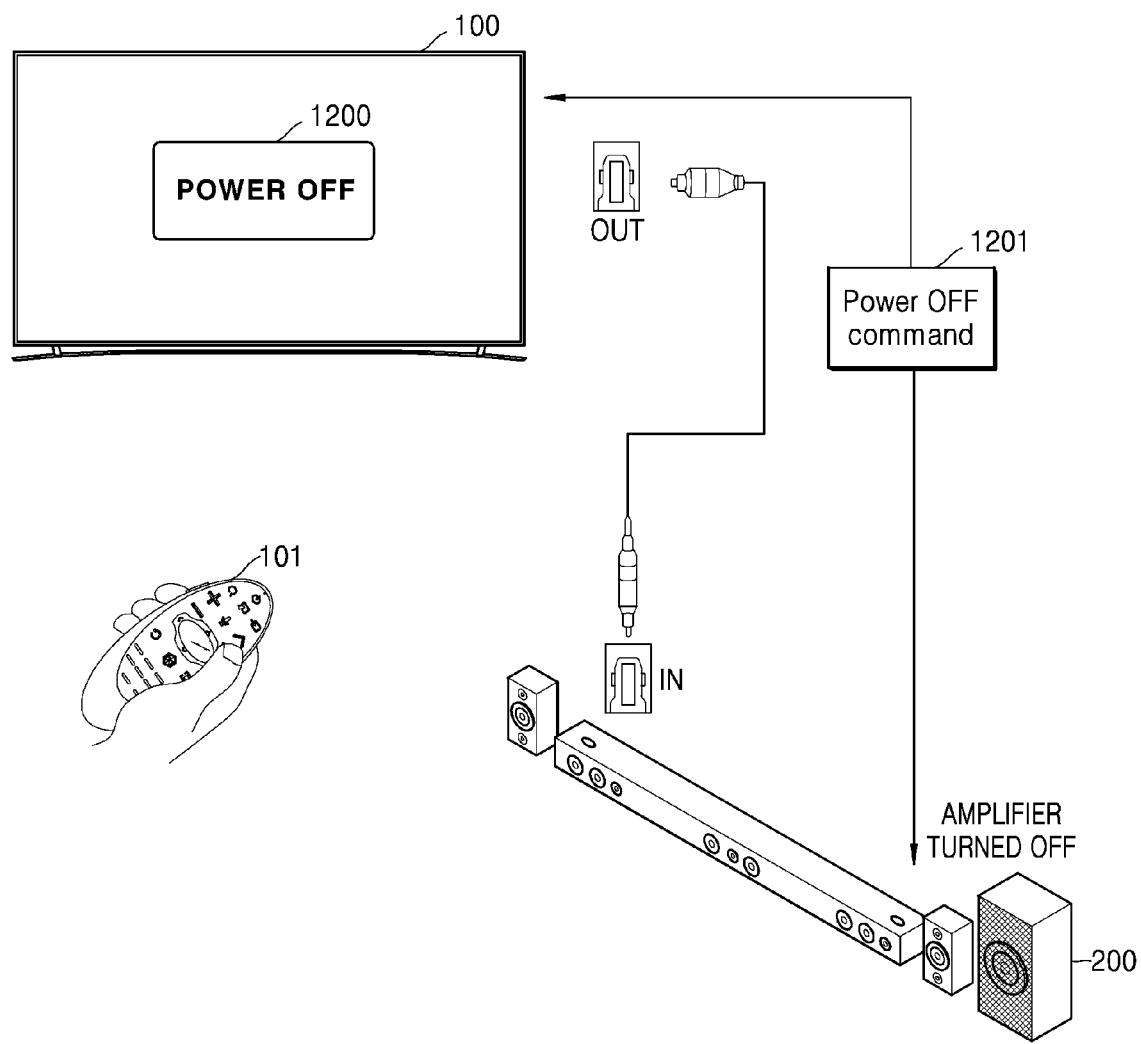
FIGS. 12A and 12B are views illustrating an example of controlling power of an electronic device and power of an audio output device in conjunction with each other, according to an embodiment.
Figure 12B:
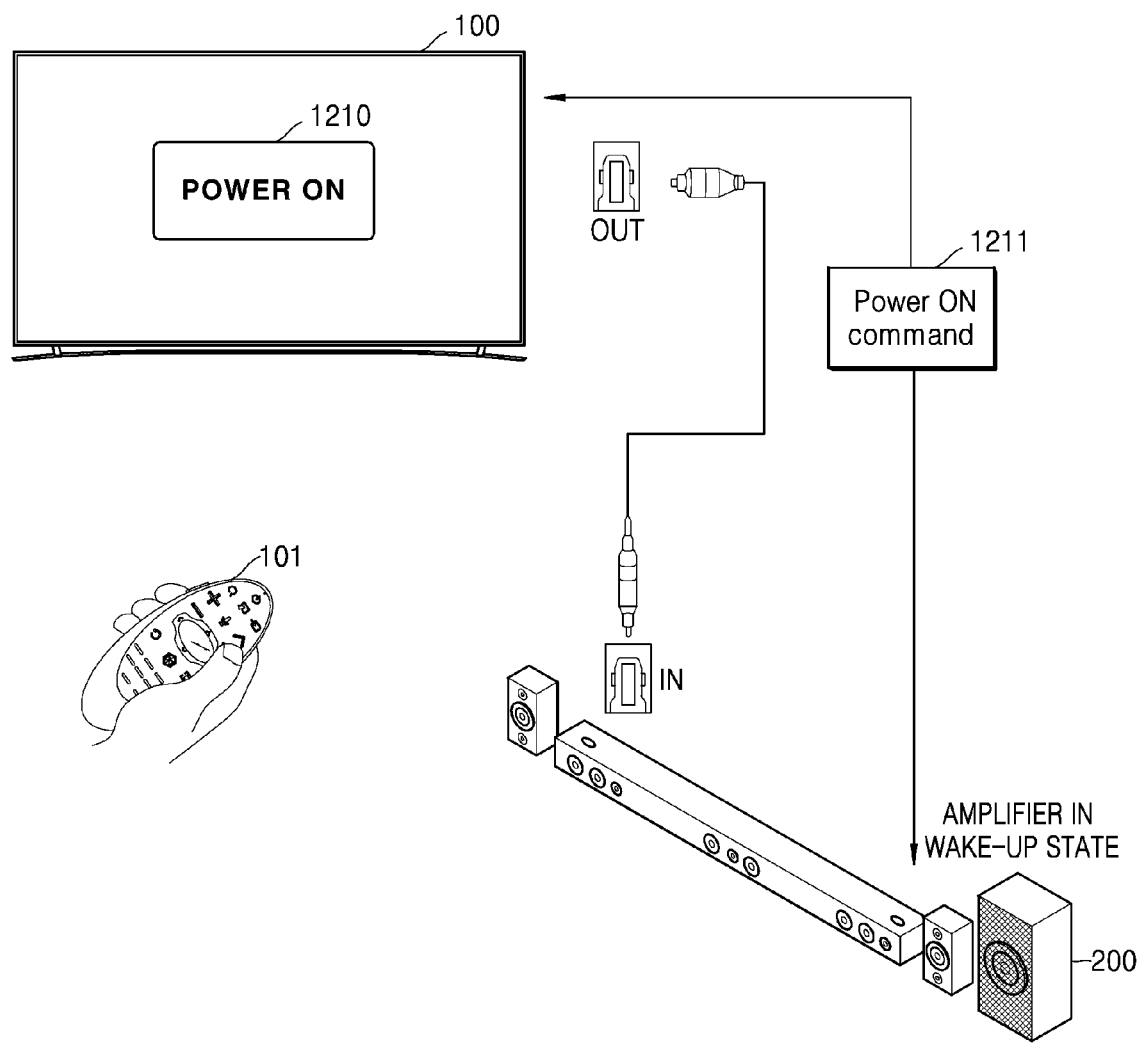

FIGS. 12A and 12B are view illustrating an example in which power of an electronic device 100 and power of an audio output device 200 are controlled in conjunction with each other, according to an embodiment.

As an external input of controlling power of the electronic device 100 is received from the control device 101, the electronic device 100 according to an embodiment may control power of the electronic device 100 and power of the audio output device 200 in conjunction with each other. For example, in response to an external input of turning off power of the electronic device 100, the electronic device 100 may transmit, to the audio output device 200, a control signal for turning off power of the audio output device 200. In addition, in response to an external input of turning on power of the electronic device 100, the electronic device 100 may transmit, to the audio output device 200, a control signal for turning on power of the audio output device 200.

Referring to FIG. 12A, the electronic device 100 may receive an external input of turning off power of the electronic device 100 from the control device 101. In response to the received external input, the electronic device 100 may perform operations needed to turn off the power of the electronic device 100, and may transmit, to the audio output device 200 via two-way communication, a command 1201 for turning off power of the audio output device 200.

In addition, as the command 1201 for turning off the power of the audio output device 200 is transmitted to the audio output device 200, the electronic device 100 may output a message 1200 notifying that the power of the audio output device 200 is turned off.

Referring to FIG. 12B, the electronic device 100 may receive an external input of turning on a power of the electronic device 100 from the control device 101. In response to the received external input, the electronic device 100 may perform operations needed to turn on the power of the electronic device 100, and may transmit a command 1211 for turning on a power of the audio output device 200 to the audio output device 200 via two-way communication. In the audio output device 200, a power of the processor 220 may be turned on, and a power of the amplifier 240 may be turned off. The processor 220 of the audio output device 200 may continuously monitor a signal received from the electronic device 100, and when the command 1211 for turning on the power of the audio output device 200 is received, the processor 220 may turn on powers of other elements of the audio output device 200 (for example, the amplifier 240). In addition, according to an embodiment, the audio output device 200 may include an additional power controller for controlling a power of the audio output device 200, besides the processor 220. When the power of the audio output device 200 is turned off, the power of the power controller is kept in an on state, and powers of other elements except the power controller (for example, the processor 220, the amplifier 240, or the like) may be turned off. Accordingly, when the command 1211 for turning on the power of the audio output device 200 is received from the electronic device 100, the power controller may transmit a command for turning on the power of the processor 220 and the amplifier 240.

In addition, the electronic device 100 may output a message 1210 notifying that the powers of the electronic device 100 and the audio output device 200 are in an on state.

Figure 13:
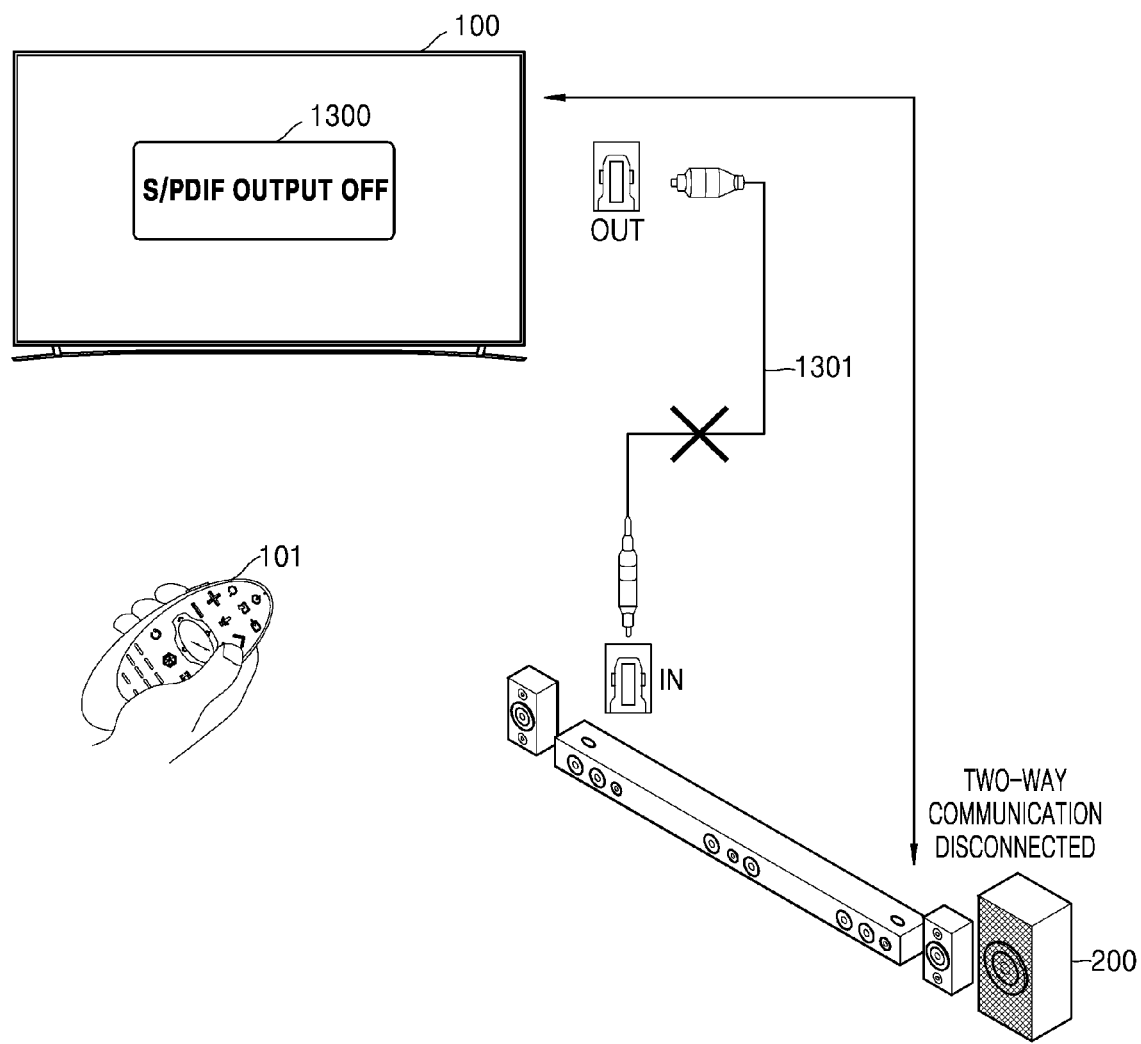
FIG. 13 is a view for describing an example where two-way communication is between an electronic device and an audio output device is interrupted, according to an embodiment.

FIG. 13 is a view for describing an example where two-way communication between an electronic device 100 and an audio output device 200 is interrupted, according to an embodiment.

In the electronic device 100 according to an embodiment, two-way communication may be disconnected when a cable used in one-way communication is separated from at least one of the electronic device 100 and the audio output device 200 or when an external input of stopping an audio signal from being output to the audio output device 200 is received.

Referring to FIG. 13, a cable 1301 used in one-way communication to transmit an audio signal may be separated from at least one of the electronic device 100 and the audio output device 200. For example, when one-way communication is communication according to the S/PDIF standard, an S/PDIF cable may be separated from at least one of the electronic device 100 and the audio output device 200. Accordingly, one-way communication between the electronic device 100 and the audio output device 200 is disconnected, and two-way communication between the electronic device 100 and the audio output device 200 may also be disconnected.

In addition, the electronic device 100 may receive, from the control device 101, an external input of stopping use of the audio output device 200. In response to the received external input, the electronic device 100 may disconnect one-way communication with the audio output device 200 for transmitting an audio signal, and thus may also disconnect two-way communication with the audio output device 200 for controlling the audio output device 200.

In addition, the electronic device 100 may output a message 1300 notifying that the S/PDIF output is off.

Figure 14:
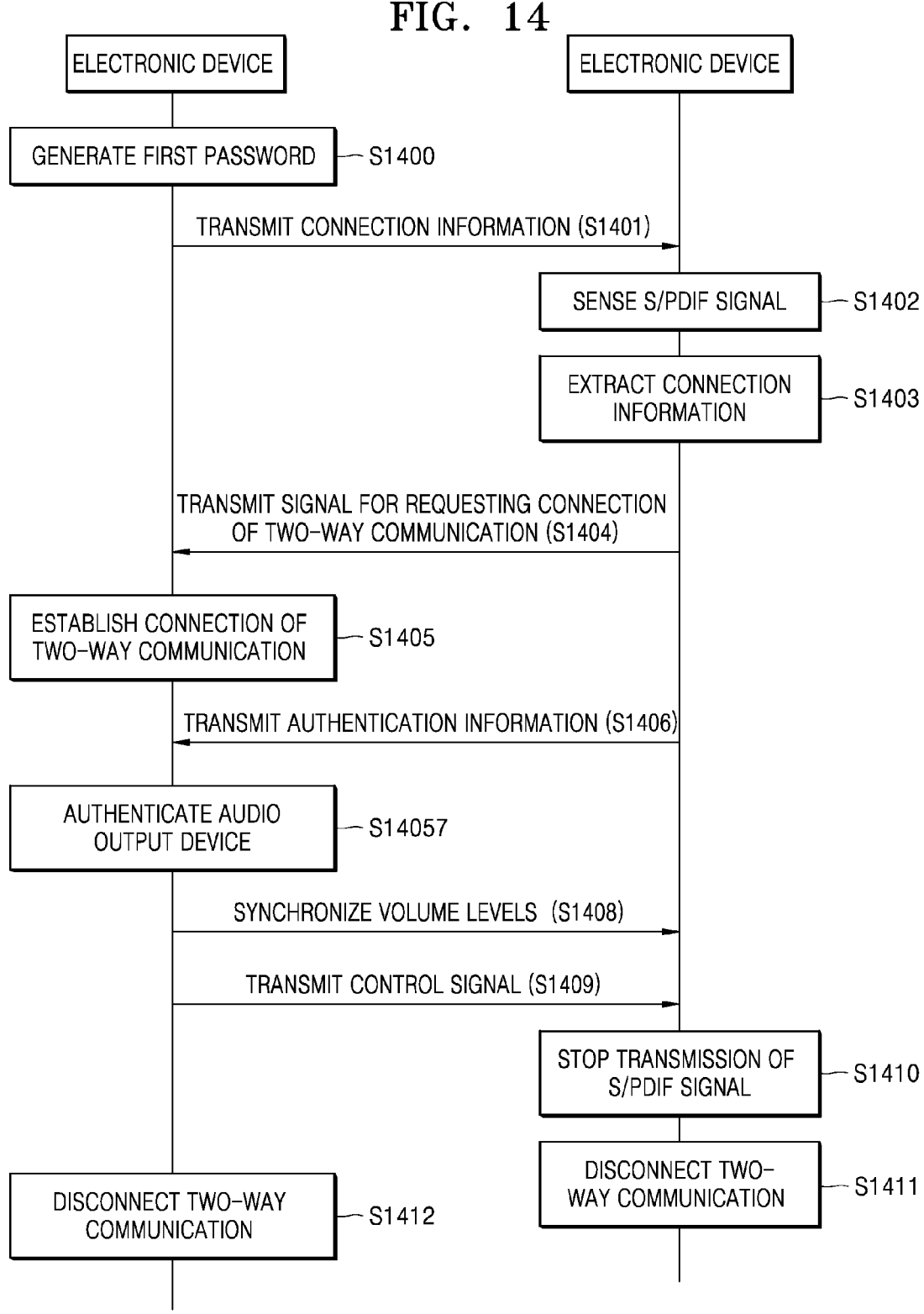
FIG. 14 is a flowchart of a process of controlling an electronic device and an audio output device in conjunction with each other, according to an embodiment.

FIG. 14 is a flowchart of a process of controlling power of an electronic device 100 and power of an audio output device 200 in conjunction with each other, according to an embodiment.

In operation S1400, the electronic device 100 may generate a first password having a random value. For example, the electronic device 100 may generate a random value by using a random number generator, but is not limited thereto.

In operation S1401, the electronic device 100 may transmit, via one-way communication, connection information used for connection of two-way communication with the audio output device 200. The connection information may include a sequence number, a first password, and a MAC address of the electronic device 100, and may further include signature according to embodiments.

In operation S1402, the audio output device 200 may sense that connection is received from the electronic device 100. For example, when one-way communication used between the electronic device 100 and the audio output device 200 is performed according to the S/PDIF standard, the audio output device 200 may sense an S/PDIF signal.

In addition, in operation S1403, the audio output device 200 may extract the sequence number, the first password, and the MAC address of the electronic device 100 from the received connection information. For example, one piece of connection information may be split and incorporated to a plurality of frames and transmitted, and when one-way communication is performed according to the S/PDIF standard, one piece of connection information may be split and incorporated to 192 frames and transmitted. For example, a portion of connection information may be included in a preset area of each of the 192 frames, and the audio output device 200 may extract one piece of connection information from the 192 frames.

In operation S1404, the audio output device 200 may transmit a signal to the electronic device 100 via two-way communication, wherein the signal is for requesting connection of two-way communication. The two-way communication used in transmitting the signal for requesting connection of two-way communication may include an insecure SPP.

In operation S1405, as the signal for requesting connection of two-way communication is received from the audio output device 200, connection of two-way communication between the electronic device 100 and the audio output device 200 may be established. When the signal for requesting connection of two-way communication is received, the electronic device 100 may establish connection of two-way communication, and may determine whether to maintain connection of two-way communication based on whether the audio output device 200 is authenticated or not.

In operation S1406, the audio output device 200 may transmit authentication information determined based on connection information received from the electronic device 100, to the electronic device 100, via two-way communication. The authentication information may include a sequence number and a first password included in connection information, and may include a second password obtains based on the sequence number, the first password, and a MAC address of the electronic device 100.

In operation S1407, the electronic device 100 may authenticate the audio output device 200 based on the received authentication information. For example, the electronic device 100 may determine whether the sequence number and the first password included in the authentication information are identical to information transmitted from the electronic device 100 to the audio output device 200. In addition, the electronic device 100 may obtain a second password based on the sequence number, the first password, and the MAC address of the electronic device 100, and may determine whether the obtained second password is identical to a second password included in the authentication information. When the sequence number, the first password, and the second password are all determined as valid values, authentication of the audio output device 200 may be completed.

In operation S1408, the electronic device 100 may transmit a signal for synchronizing volume levels of the electronic device 100 and the audio output device 200, to the audio output device 200. For example, when a volume level of the electronic device 100 is 15, and a volume level of the audio output device 200 is 10, the electronic device 100 may transmit a command for adjusting the volume level of the audio output device 200 to 15, to the audio output device 200. According to an embodiment, a number of volume levels adjustable by the electronic device 100 may be different from that of volume levels adjustable by the audio output device 200. For example, the electronic device 100 may adjust a volume to a total of 30 levels, and the audio output device 200 may adjust a volume to a total of 60 levels. The electronic device 100 may transmit a command for adjusting a number of volume levels adjustable by the audio output device 200 to be the same as that of volume levels adjustable by the electronic device 100. In response to the command received from the electronic device 100, the audio output device 200 may synchronize a volume level of the audio output device 200 with a volume level of the electronic device 100.

In operation S1409, the electronic device 100 and the audio output device 200 may transmit or receive, to or from each other, a control signal for controlling the electronic device 100 and the audio output device 200 in conjunction with each other, via two-way communication. For example, when an external input of controlling a volume level is received from the control device 101 controlling the electronic device 100, the electronic device 100 may transmit a command for controlling a volume level of the audio output device 200, to the audio output device 200. In addition, when an external input of controlling a volume level is received from a control device controlling the audio output device 200, the audio output device 200 may control a volume level of the audio output device 200 and transmit a volume control signal to the electronic device 100. Accordingly, the electronic device 100 may display a message notifying that a volume level of an audio signal is controlled.

In operation S1410, the audio output device 200 may sense that there is no signal received from the electronic device 100 via one-way communication. For example, when a cable used in one-way communication is separated from at least one of the electronic device 100 and the audio output device 200 or an external input of stopping use of the audio output device 200 is received, the electronic device 100 may transmit no more signals to the audio output device 200 via one-way communication.

Accordingly, in operation S1411, the audio output device 200 may disconnect two-way communication with the electronic device 100, and in operation S1412, the electronic device 100 may also disconnect two-way communication with the audio output device 200. For example, the electronic device 100 may transmit an audio signal to the audio output device 200 via communication according to the S/PDIF standard, and may transmit or receive a control signal to or from the audio output device 200 via Bluetooth communication. When a cable used in one-way communication is separated from at least one of the electronic device 100 and the audio output device 200 or an external input of stopping use of the audio output device 200 is received, the electronic device 100 may transmit no more signals to the audio output device 200 via communication according to the S/PDIF standard. Accordingly, as there is no need to transmit a control signal for controlling the electronic device 100 and the audio output device 200 in conjunction with each other, connection of Bluetooth communication connection between the electronic device 100 and the audio output device 200 may be interrupted.

Figure 15:
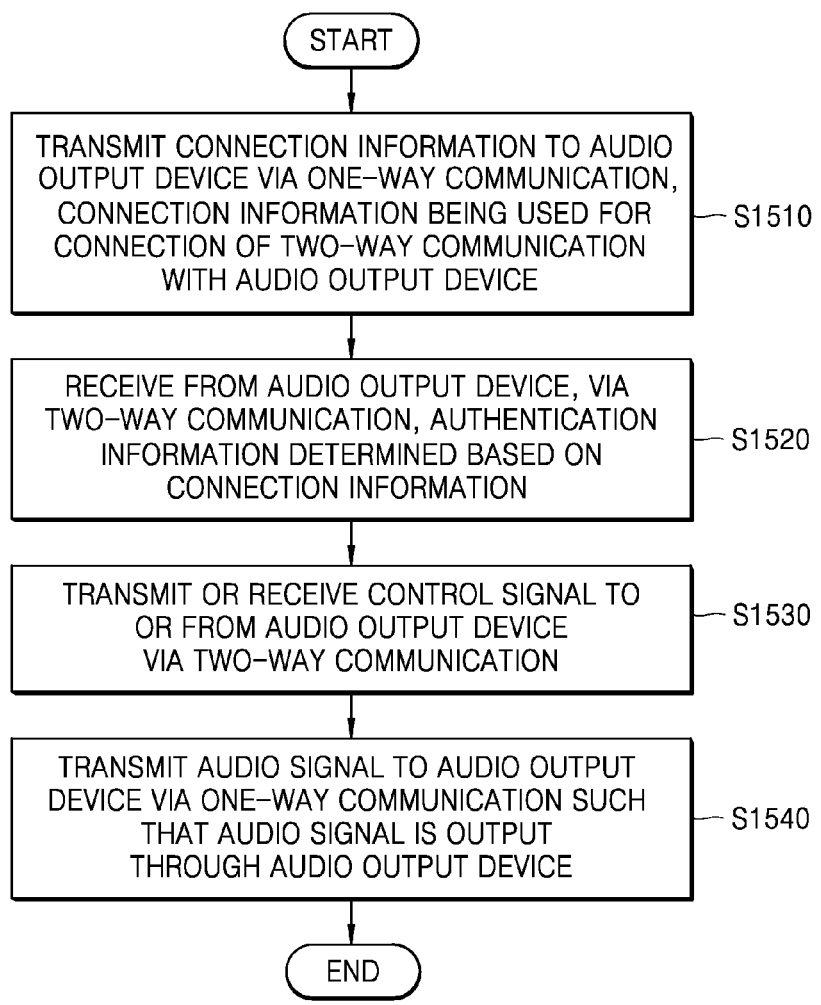
FIG. 15 is a flowchart of an operating method of an electronic device, according to an embodiment.

FIG. 15 is a flowchart of an operating method of an electronic device 100 according to an embodiment.

In operation S1510, the electronic device 100 may transmit connection information to the audio output device 200 via one-way communication, the connection information being used for connection of two-way communication with the audio output device 200.

For example, when the electronic device 100 and the audio output device 200 are physically connected via a cable used in two-way communication or in response to an external input of requesting output of an audio signal through the audio output device 200, the electronic device 100 may transmit, to the audio output device 200, connection information used for connection of two-way communication with the audio output device 200.

One-way communication is used in transmitting an audio signal to the audio output device 200, and may include communication according to the S/PDIF standard, but is not limited thereto.

The electronic device 100 may transmit connection information by dividing the connection information into a plurality of frames. For example, the electronic device 100 may include a portion of connection information in a preset area of each of the plurality of frames. Connection information according to an embodiment may include a sequence number, a first password, and a MAC address of the electronic device 100, but is not limited thereto.

In operation S1520, the electronic device 100 may receive from the audio output device 200, via two-way communication, authentication information determined based on the connection information.

Authentication information may include the sequence number and the first password that the audio output device 200 has received from the electronic device 100 and a second password obtained from the sequence number and the first password.

Examples of two-way communication may include Bluetooth or Wi-Fi communication, but are not limited thereto. In order to receive authentication information via two-way communication, connection of two-way communication between the electronic device 100 and the audio output device 200 has to be established. In response to the connection information received from the electronic device 100, the audio output device 200 may transmit, to the electronic device 100, a signal for requesting connection of two-way communication, and as the signal for requesting connection of two-way communication is received, the electronic device 100 may establish connection of two-way communication. In addition, the electronic device 100 may authenticate the audio output device 200 based on the received authentication information, and may determine, based on an authentication result, whether to maintain connection of two-way communication with the audio output device 200.

In operation S1530, as the audio output device 200 is authenticated based on the received authentication information, the electronic device 100 may transmit or receive a control signal to or from the audio output device 200 via two-way communication.

A control signal may include at least one of a signal for controlling the audio output device 200 and a signal for controlling the electronic device 100. In addition, a control signal may include at least one of a volume control signal for controlling a volume of an audio signal, a mute function control signal for controlling a mute function, and a power control signal for controlling power.

In operation S1540, the electronic device 100 may transmit an audio signal to the audio output device 200 via one-way communication such that the audio signal is output through the audio output device 200.

Embodiments may also be realized in a form of a recording medium including commands executable by a computer, such as a program module executed by a computer. A computer-readable medium may be an arbitrary available medium accessible by a computer, and may be any one of volatile, nonvolatile, separable, and non-separable media. Also, examples of the computer-readable medium may include a computer storage medium and a communication medium. Examples of the computer storage medium include volatile, nonvolatile, separable, and non-separable media realized by an arbitrary method or technology for storing information about a computer-readable command, a data structure, a program module, or other data. The communication medium may include a computer-readable command, a data structure, a program module, other data of a modulated data signal, such as carrier waves, or other transmission mechanisms, and may be an arbitrary information transmission medium.

In addition, terms such as a " . . . unit" used in the specification refers to a hardware component such as circuit and/or a software component executed by a hardware component such as a processor.

It is obvious to one of ordinary skill in the art that the disclosure may be easily embodied in many different forms without changing the technical concept or essential features of the disclosure. Thus, it should be understood that the embodiments described herein should be considered in a descriptive sense only and not for purposes of limitation. For example, configuring elements that are singular forms may be executed in a distributed fashion, and also, configuring elements that are distributed may be combined and then executed.

The scope of the present disclosure is defined not by the detailed description of the present disclosure but by the appended claims, and all differences within the scope will be construed as being included in the present disclosure.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
   a communicator configured to perform a communication via two-way communication;
   an audio output interface configured to transmit an audio signal of a predetermined data format to an audio output device via one-way communication;
   a memory configured to store one or more instructions; and
   a processor configured to execute the one or more instructions stored in the memory to:
   process an audio data to generate the audio signal of the predetermined data format;
   process connection information which is used for connection of two-way communication between the electronic device and the audio output device, such that the connection information is included in the audio signal of the predetermined data format;
   control the audio output interface to transmit, to the audio output device the audio signal of the predetermined data format including the connection information;
   control the communicator to receive, from the audio output device via the two-way communication, authentication information determined based on the connection information;
   establish the connection of the two-way communication between the electronic device and the audio output device based on the authentication information received from the audio output device; and
   based on a user input for controlling an audio output function of the electronic device being received, control the communicator to transmit to the audio output device a control signal corresponding to the user input while the audio signal of the predetermined data format is being transmitted to the audio output device through the audio output interface via the one-way communication.

2. The electronic device of claim 1, wherein the connection information comprises a sequence number, a first password, and a Media Access Control (MAC) address of the electronic device,
   wherein the authentication information comprises a second password, the sequence number, and the first password, the second password being generated based on the sequence number, the first password, and the MAC address of the electronic device.

3. The electronic device of claim 2, wherein the second password is acquired by performing a shift operation, by a preset number of bits, on data of two bytes selected based on the sequence number and the first password, from among data of a plurality of bytes of the MAC address of the electronic device.

4. The electronic device of claim 1, wherein the control signal comprises at least one from among a volume control signal for controlling a volume of the audio output device, a mute control signal for controlling a mute function of the audio output device, or a power control signal for controlling power state of the audio output device.

5. The electronic device of claim 1, wherein the processor is further configured to execute the one or more instructions to disconnect the two-way communication based on a cable used in the one-way communication being separated from at least one of the electronic device or the audio output device or based on an external input of stopping an audio signal from being output to the audio output device being received.

6. The electronic device of claim 1, wherein the processor is further configured to execute the one or more instructions to:
   start establishing connection of the two-way communication between the electronic device and the audio output device in response to a signal for requesting connection of the two-way communication, the signal being received from the audio output device; and
   maintain connection of the two-way communication according to the authentication of the audio output device based on the received authentication information.

7. The electronic device of claim 1, wherein the one-way communication comprises communication according to the Sony/Philips Digital Interface (S/PDIF) standard, and
   wherein the two-way communication comprises communication using Bluetooth or Wi-Fi.

8. The electronic device of claim 1, wherein the processor is further configured to execute the one or more instructions to synchronize a volume level of the electronic device and a volume level of the audio output device according to the authentication of the audio output device based on the received authentication information.

9. The electronic device of claim 1, wherein the processor is further configured to execute the one or more instructions to control the audio output interface to divide the connection information into a plurality of frames and transmit the divided connection information to the audio output device,
   wherein a portion of the connection information is included in a preset area of each of the plurality of frames.

10. The electronic device of claim 1, further comprising a display, wherein the processor is further configured to execute the one or more instructions to control the display to output a notification message corresponding to the control signal.

11. An audio output device comprising:
an amplifier;
an interface module;
a communicator;
a memory configured to store one or more instructions; and
a processor configured to execute the one or more instructions stored in the memory to:
control the interface module to receive, from an electronic device via one-way communication, connection information which is used for two-way communication between the audio output device and the electronic device;
control the communicator to transmit, to the electronic device via the two-way communication, authentication information which is determined based on the connection information;
control the communicator to transmit to or receive from the electronic device a control signal, via the two-way communication; and
control the amplifier to output an audio signal received through the interface module from the electronic device via the one-way communication.

12. An operating method comprising:
processing, by an electronic device, audio data to generate an audio signal of a predetermined data format;
processing, by the electronic device, connection information which is used for connection of two-way communication between the electronic device and an audio output device, such that the connection information is included in the audio signal of the predetermined data format;
transmitting, by the electronic device, to the audio output device via one-way communication, the audio signal of the predetermined data format including the connection information;
receiving, by the electronic device from the audio output device via the two-way communication, authentication information which is determined based on the connection information;
establishing the connection of the two-way communication between the electronic device and the audio output device based on the authentication information received from the audio output device; and
based on a user input for controlling an audio output function of the electronic device being received, transmitting, by the electronic device, to the audio output device a control signal corresponding to the user input while the audio signal of the predetermined data format is being transmitted to the audio output device via the one-way communication, wherein the electronic device comprises a hardware processor.

13. The operating method of claim 12, wherein the connection information comprises a sequence number, a first password, and a Media Access Control (MAC) address of the electronic device,
wherein the authentication information comprises a second password, the sequence number, and the first password, the second password generated based on the sequence number, the first password, and the MAC address of the electronic device.

14. The operating method of claim 13, wherein the second password is acquired by performing a shift operation, by a preset number of bits, on data of two bytes selected based on the sequence number and the first password, from among data of a plurality of bytes of the MAC address of the electronic device.

15. The operating method of claim 12, wherein the receiving of the authentication information from the audio output device comprises:
starting establishing connection of the two-way communication between the electronic device and the audio output device in response to a signal received from the audio output device, wherein the signal is for requesting connection of the two-way communication; and
maintaining connection of the two-way communication according to the authentication of the audio output device based on the received authentication information.

16. The operating method of claim 12, wherein the one-way communication comprises communication according to the Sony/Philips Digital Interface (S/PDIF) standard,
wherein the two-way communication comprises communication using Bluetooth or Wi-Fi.

17. The operating method of claim 12, further comprising outputting a notification message corresponding to the control signal.

18. A non-transitory computer-readable recording medium having recorded thereon a program for executing the operating method of claim 12.

* * * * *